(12) United States Patent
Eickhoff et al.

(10) Patent No.: US 12,729,032 B2
(45) Date of Patent: Sep. 8, 2026

(54) LAMINATE CONTAINER

(71) Applicant: Berry Global, Inc., Evansville, IN (US)

(72) Inventors: Jonathan Eickhoff, Evansville, IN (US); Jared Bruce Waterman, Evansville, IN (US); Jeffrey A. Mann, Evansville, IN (US); Ryan Dewig, Haubstadt, IN (US); Bryan Gillespie, Altoona, WI (US)

(73) Assignee: Berry Global, Inc., Evansville, IN (US)

( * ) Notice: Subject to any disclaimer, the term of this patent is extended or adjusted under 35 U.S.C. 154(b) by 0 days.

(21) Appl. No.: 17/170,425

(22) Filed: Feb. 8, 2021

(65) Prior Publication Data

US 2021/0245914 A1 Aug. 12, 2021

Related U.S. Application Data

(60) Provisional application No. 62/971,553, filed on Feb. 7, 2020.

(51) Int. Cl.
*B65D 1/28* (2006.01)
*B32B 1/00* (2006.01)
*B32B 27/08* (2006.01)

(52) U.S. Cl.
CPC .................. *B65D 1/28* (2013.01); *B32B 1/00* (2013.01); *B32B 27/08* (2013.01); *B32B 2307/732* (2013.01); *B32B 2439/62* (2013.01)

(58) Field of Classification Search
CPC ................. B32B 1/02; Y10T 428/1352; Y10T 428/1379; Y10T 428/1383; B23B 1/02
USPC ..................................... 428/35.7, 36.6, 36.7
See application file for complete search history.

(56) References Cited

U.S. PATENT DOCUMENTS 4,249,659 A * 2/1981 Schirmer .................. B65B 9/00 206/497
4,528,221 A * 7/1985 Komatsuzaki ........ B32B 27/065 428/318.6
6,316,067 B1 * 11/2001 Edwards ................ B32B 27/08 428/476.3
2006/0254218 A1 11/2006 Yamamoto
2007/0009693 A1 1/2007 Inaba et al.
2009/0169780 A1 * 7/2009 Kimura ................ B65D 23/085 428/34.1
2010/0163450 A1 * 7/2010 Branch ............... B29C 44/0461 206/524.6
2010/0288131 A1 * 11/2010 Kilber ................ B65D 85/8061 99/290

(Continued)

FOREIGN PATENT DOCUMENTS

CN 104476753 B 1/2017
JP 11170455 A * 6/1999

(Continued)

OTHER PUBLICATIONS

PCT International Search and Written Opinion in corresponding International Application No. PCT/US2021/017103 mailed Apr. 20, 2021, all enclosed pages cited.

(Continued)

*Primary Examiner* — Alicia Chevalier
(74) *Attorney, Agent, or Firm* — Barnes & Thornburg LLP

(57) ABSTRACT

A container and a method of producing the container are disclosed, wherein the container is formed of a laminate having a base layer and a sheet.

12 Claims, 16 Drawing Sheets

(56) References Cited

U.S. PATENT DOCUMENTS

2011/0178222 A1* 7/2011 Kani .......................... C08J 3/226 524/503
2012/0308689 A1 12/2012 Poulat et al.
2014/0328979 A1* 11/2014 Habraken ............... A23L 33/40 53/433
2017/0100872 A1 4/2017 Clarke

FOREIGN PATENT DOCUMENTS

JP 2003220674 A * 8/2003
JP 6439428 A * 11/2018
WO WO-0078635 A1 * 12/2000

OTHER PUBLICATIONS

European Search Report for Counterpart European Patent App. No. 21750135.2 dated Feb. 19, 2024, 10 pages.

* cited by examiner

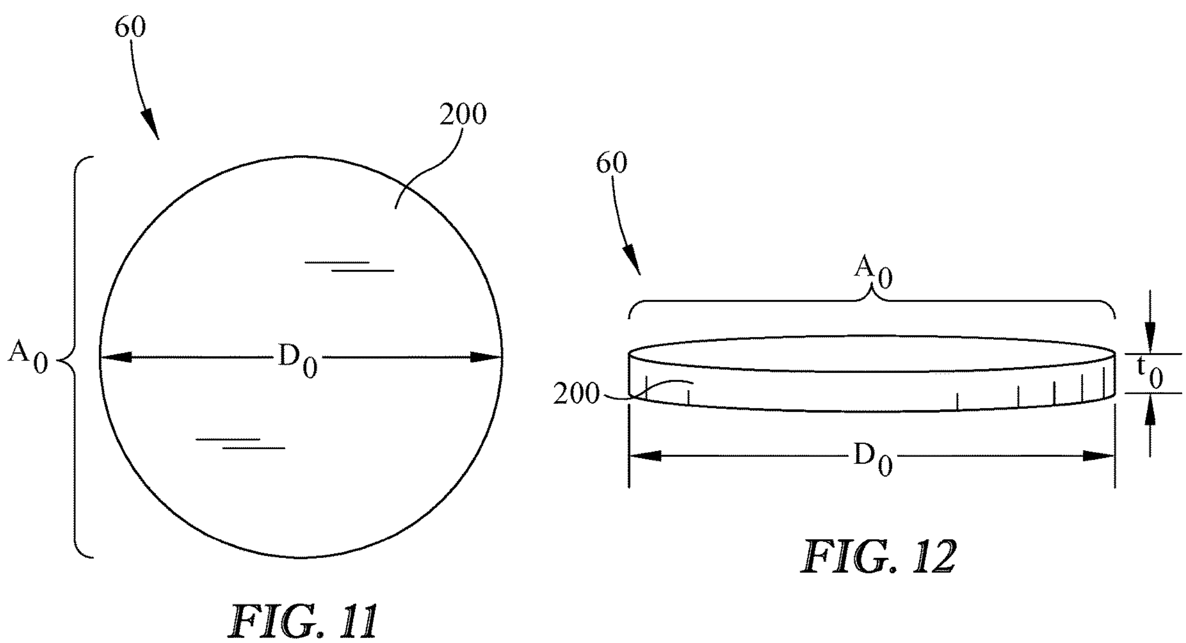
FIG. 11
FIG. 12
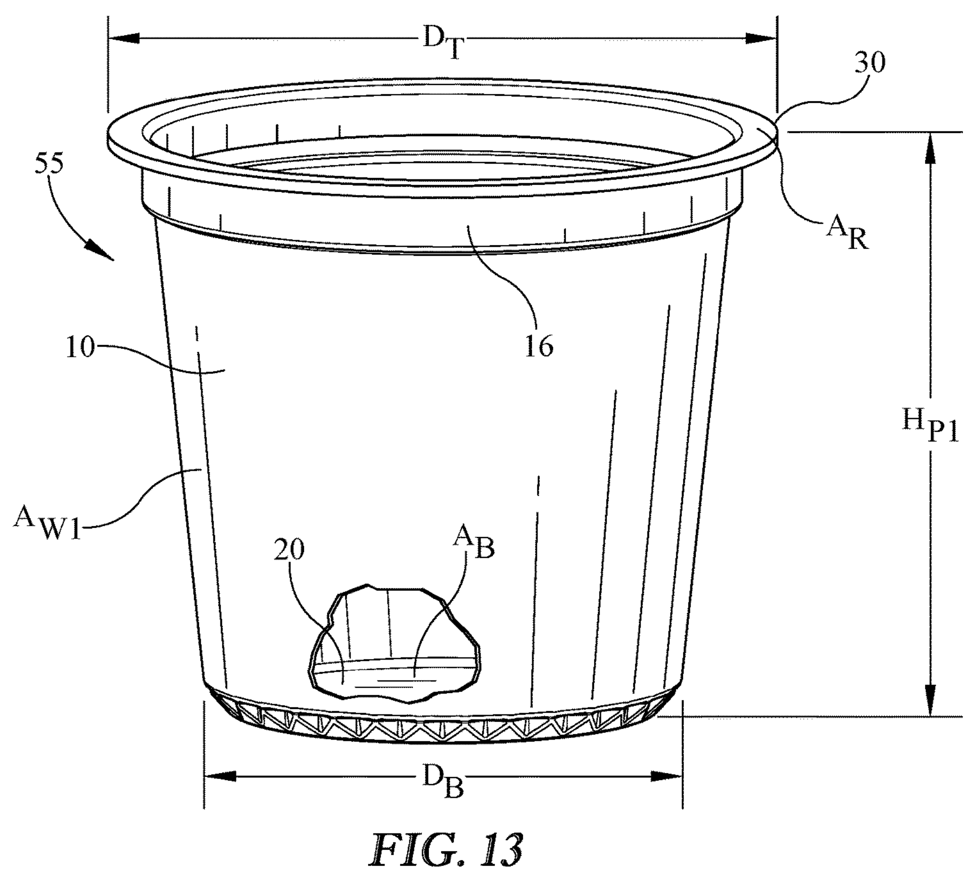
FIG. 13

900
A_S
200
L_S
W_S

900
A_S
t_0
200
W_S
L_S

W_ST
L_ST
A_SR
730
700
716
710
H_P2
720
A_W2
A_SB
W_SB
L_SB

LAMINATE CONTAINER

PRIORITY CLAIM

This application claims priority under 35 U.S.C. § 119(e) to U.S. Provisional Application Ser. No. 62/971,553, filed Feb. 7, 2020, which is expressly incorporated by reference herein.

TECHNICAL FIELD

The present disclosure relates generally to a container, and more specifically to a laminate container formed from a sheet laminated with a base layer.

BACKGROUND

It is often desirable to store product or contents in a container or package. It is often desirable to provide the container or package with multiple layers for a purpose or variety of purposes, such as a barrier layer that may increase the shelf life of the container or package contents, a layer for decorative purposes, for tactile purposes, or for any other purpose or combination of purposes. A container or package may be provided with multiple layers for any or all of these purposes while being provided in a way that optimizes or minimizes the amount of material required to achieve them. For example, the laminate container discussed herein may be used for as a part of a package for use in a beverage brewing system, such as a single use beverage brewing system. A package may be provided that may be used in such a system, wherein the package has barrier properties that may enhance the shelf life of its contents while also minimizing or optimizing the materials used therein, and/or facilitating recyclability of the container or package.

SUMMARY

Certain embodiments according to the present disclosure provide a container formed from a laminate including a base layer and a sheet. The sheet may be relatively thin and provide any of a variety of properties, such as barrier properties, sealing properties, or decoration, for example.

In one aspect, for instance, a container may be provided having a side wall having a side wall area and a bottom having a bottom area. The side wall and bottom are formed from a laminate having a base layer and a sheet. The base layer has a base layer thickness and the sheet has a sheet thickness. The laminate has a laminate thickness that is at least the sum of the base layer thickness and the sheet thickness. The sheet has at least one sheet layer and the at least one sheet layer has a thickness that is equal to or less than 5% of the laminate thickness. The side wall and bottom at least partially define a part area. The container is formed from the laminate having a laminate area used to form the container. The formed container has an areal draw ratio of greater than about 2.5.

In another aspect, for instance, a container may be provided having a side wall having a side wall area and a bottom having a bottom area. The side wall and bottom are formed from a laminate having a base layer and a sheet. The sheet has a sheet thickness, the sheet includes at least one barrier layer having a barrier layer thickness, and wherein the base layer has a base layer thickness. The laminate has a laminate thickness. The barrier layer thickness is less than about 5% of the laminate thickness. The side wall and bottom at least partially define a part area. The container is formed from a portion of laminate having a laminate area. The container has an areal draw ratio of greater than about 2.5.

In yet another aspect, for instance, a process for forming a container is provided. A base layer is formed from a base layer material. A sheet having at least one layer is provided. The base layer is laminated to the sheet to form a laminate. The laminate is thermoformed into a part with an areal draw ratio of at least about 2.5.

BRIEF DESCRIPTION OF THE DRAWINGS

Embodiments now will be described more fully hereinafter with reference to the accompanying drawings, in which some, but not all embodiments may be shown. Indeed, embodiments may be illustrated or described in many different forms and the present disclosure should not be construed as limited to the embodiments set forth herein. Like numbers refer to like elements throughout, and wherein:

FIG. 11 illustrates a top view of a portion of an embodiment of a sheet in disk form suitable for use in a forming process;

FIG. 12 illustrates a side perspective view of the disk of FIG. 9;

FIG. 13 illustrates a side perspective view of an embodiment of a part or container formed from the portion of sheet in disk form of FIGS. 11 and 12;

DETAILED DESCRIPTION

Embodiments now will be described more fully hereinafter with reference to the accompanying drawings, in which some, but not all embodiments may be shown. Indeed, embodiments may take many different forms and the present disclosure should not be construed as limited to the embodiments set forth herein. As used in the specification, and in the appended claims, the singular forms "a", "an", "the", include plural referents unless the context clearly dictates otherwise.

The terms "substantial" or "substantially" may encompass the whole as specified, according to certain embodiments, or largely but not the whole specified according to other embodiments.

Figure 1:
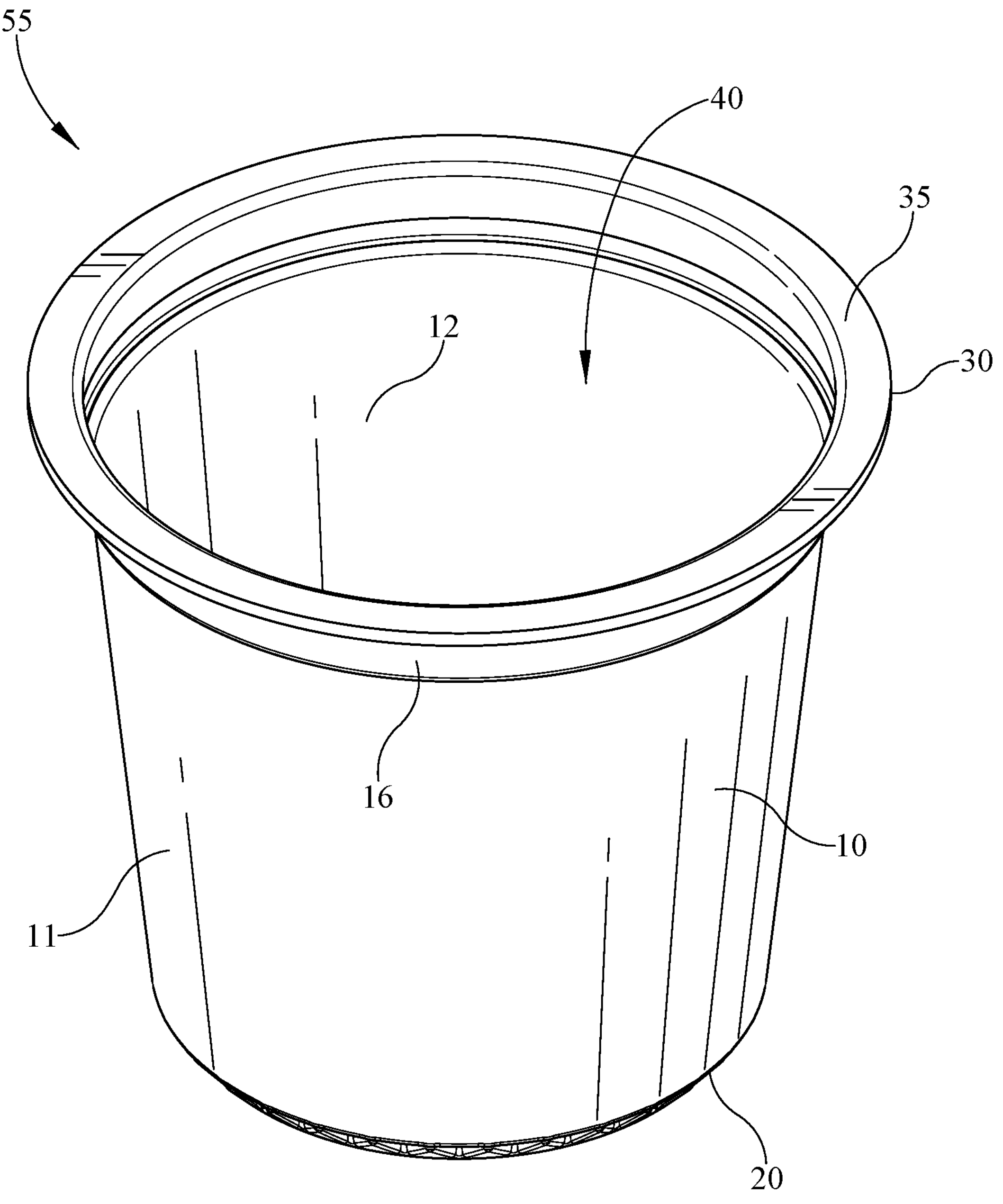
FIG. 1 illustrates a perspective view of an embodiment of a generally cylindrical container, which may be configured for use in a beverage brewing system, for example.
Figure 2:
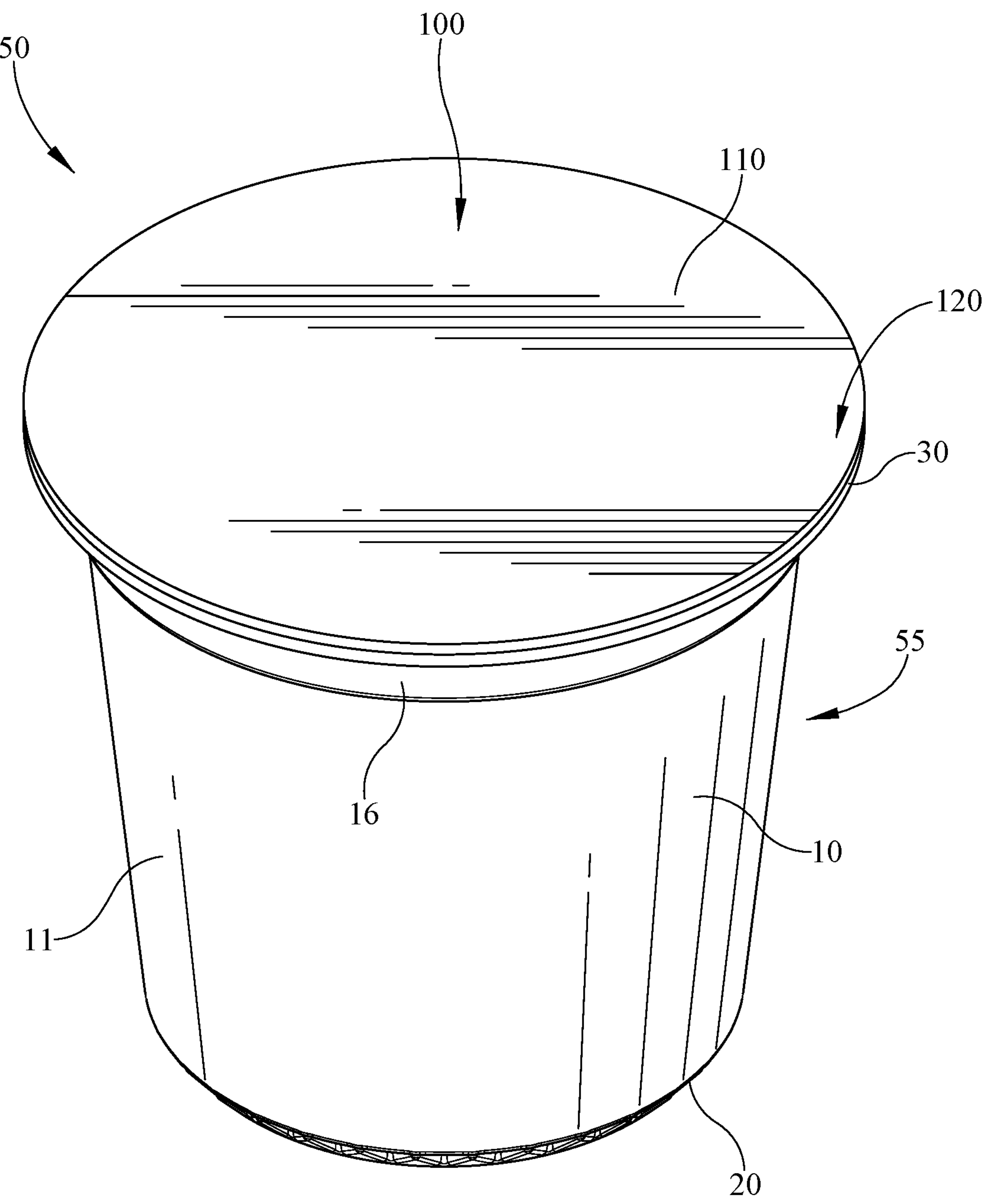
FIG. 2 illustrates a perspective view of an embodiment of a pod type package incorporating the container of FIG. 1, which may be used for example in a beverage brewing system.

Some embodiments of a package 50 incorporating a container 55 and components thereof may have features similar to those shown, for example, in FIGS. 1 and 2. Package 50 may include a cup or pod style container 55 having a product storage region 40 at least partially defined by a side wall 10 and/or a bottom 20. Container 55 may be formed in a pod style or type suitable for use in a beverage brewing apparatus, for example, though it is understood container 55 may take any of a variety of shapes, sizes, or forms, as discussed more below. Container 55 may include a flange or rim 30 adjacent an opening into product storage region 40 and/or adjacent a top of side wall 10. Container 55 and/or side wall 10 may have an outer surface 11 and/or an inner surface 12. Container 55 may include features such as a shoulder 16 and/or ribs on bottom 20 for any of a variety of reasons, including, but not limited to, to structurally support and/or strengthen container 55, and/or to facilitate stacking of one or more containers 55, for example. If shoulder 16 and/or other surface features (e.g., ribs, bumps, recesses, etc.) are included, it is understood that there may be virtually any number of them, they may be arranged in virtually any manner, for example symmetrical or asymmetrical, any or all of them may extend for virtually any amount of the height, width, and/or thickness of container 55 anywhere from the bottom 20 to the rim 30 or anywhere in between, and/or shoulder 16 or other features may be omitted as they are optional. Container 55 may include a sealing surface 35 on or near flange 30, for example, to provide a convenient surface for sealing a lid 100 to container 55.

Package 50 may include container 55 and/or lid 100, as shown for example in FIG. 2, for any of a variety of reasons, including but not limited to providing a sealed package for storing contents and/or for extending the life or shelf life of the contents. For example, package 50 may include contents for preparing a beverage, such as coffee ground or tea leaves as represented for example by contents 80 shown in FIG. 18. To help provide an extended shelf life, or for any other reason, package 50, container 55, and/or lid 100 may include a barrier or barrier properties, for example, to prevent, inhibit, and/or slow the transmission of oxygen or other gases that may through package 50. Oxygen and/or other gases may act to break down, decay, and/or spoil certain contents 80 and thus package 50 and/or any component thereof may be provided with barrier properties or other properties to slow, inhibit, and/or prevent the transmission of such gases into or through package 50. Lid 100 may include a central or covering area 110 and/or a peripheral or sealing area 120, as discussed more below with reference to FIG. 18.

Figure 3:
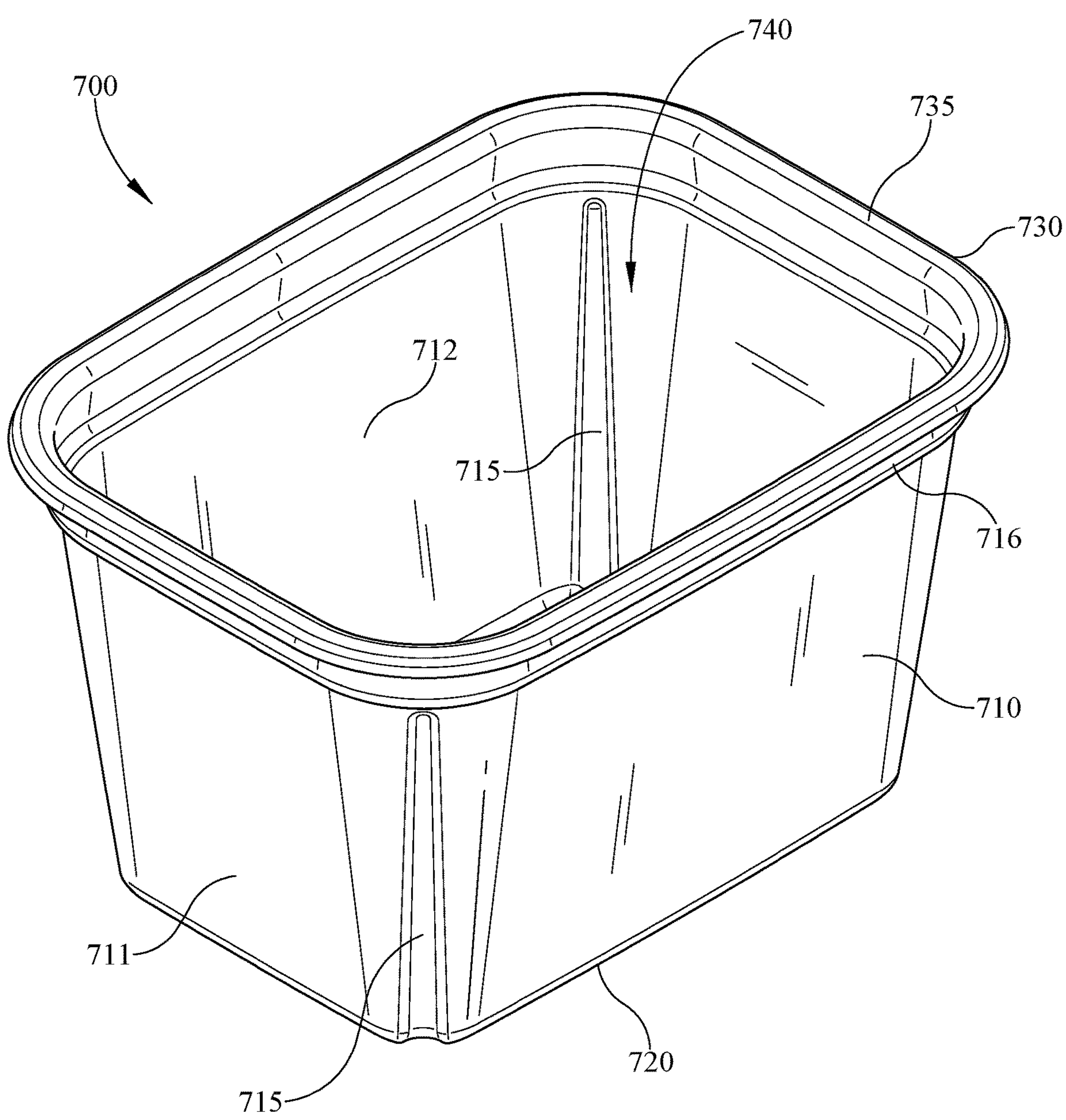
FIG. 3 illustrates a perspective view of another embodiment of a container, which is generally rectangular.
Figure 4:
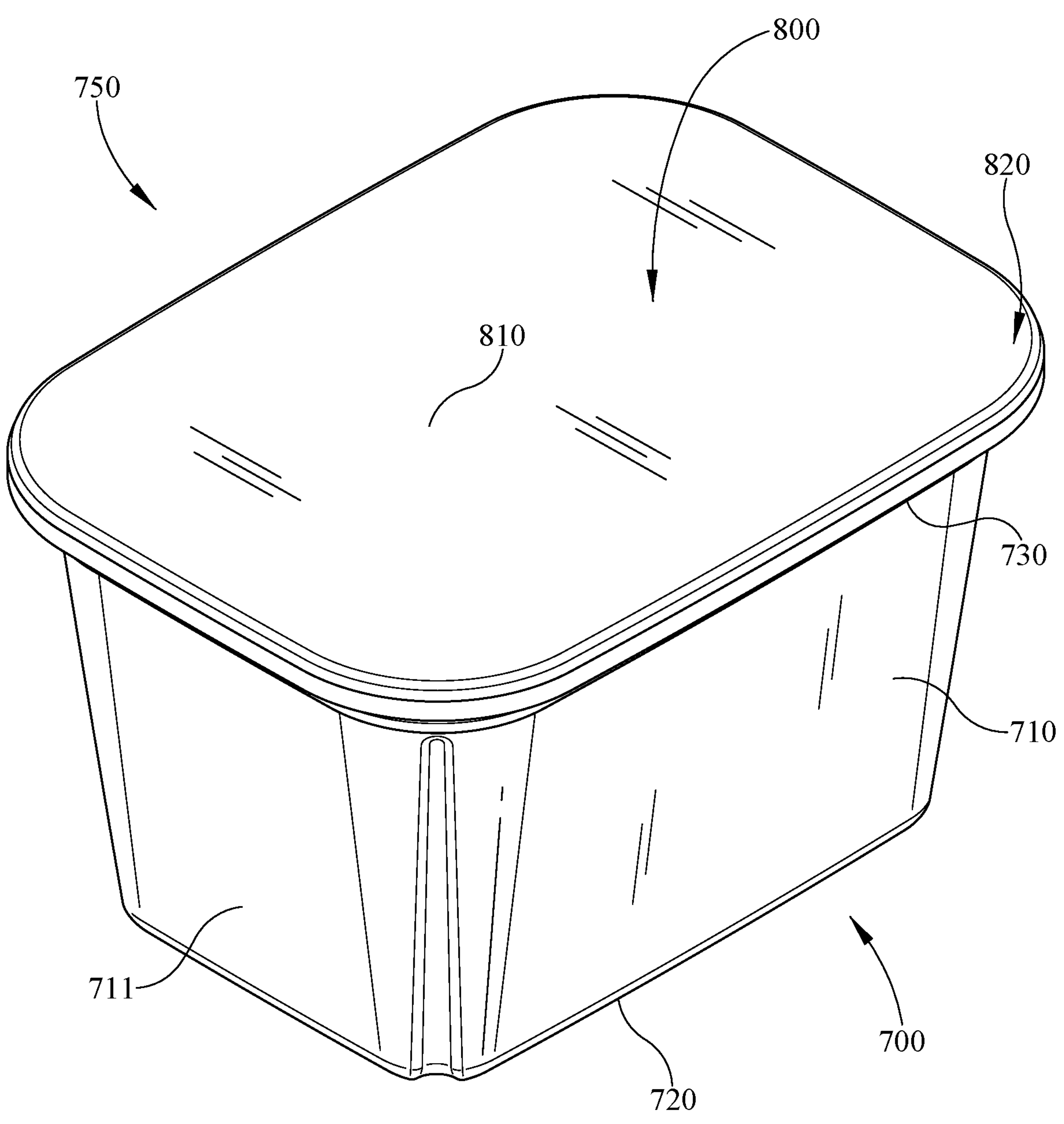
FIG. 4 illustrates a perspective view of another embodiment of a package incorporating the container of FIG. 3.

An alternative embodiment of a package 750 incorporating a container 700 and components thereof are shown, for example, in FIGS. 3 and 4. Package 750 may include a tub style or type container 700 having a product storage region 740 at least partially defined by a side wall 710 and a bottom 720. Container 700 may be formed in a tub style and/or in virtually in any shape such as the substantially rectangular shape shown in FIGS. 3 and 4. For example, container 700 may be suitable for use for storage and/or preserving perishable products such as food, although it is understood that container 700 and/or package 750 may be used for any of a variety of reasons or combination thereof without limitation. Container 700 may include a flange or rim 730 adjacent an opening into product storage region 740 and/or adjacent a top of side wall 710. Container 700 and/or side wall 710 may have an outer surface 711 and/or an inner surface 712. Container 700 may include features such as a shoulder 716 and/or flutes 715 for any of a variety of reasons, including, but not limited to, to structurally support and/or strengthen container 700, and/or to facilitate stacking of one or more containers 700, for example. If flutes 715 and/or other surface features (e.g., ribs, bumps, recesses, etc.) are included, it is understood that there may be virtually any number of them, they may be arranged in virtually any manner, for example symmetrical or asymmetrical, any or all of them may extend for virtually any amount of the height, width, and/or thickness of container 700 anywhere from the bottom 720 to the rim 730 or anywhere in between, and/or flutes 715 or other features may be omitted as they are optional. Container 700 may include a sealing surface 735 on or near flange 730, for example, to provide a convenient surface for sealing a lid 800 to container 700 to form package 750.

Package 750 may include container 700 and/or lid 800, as shown for example in FIG. 4, for any of a variety of reasons, including but not limited to protecting or containing contents, providing a sealed package for storing contents and/or for extending the life or shelf life of the contents. Lid 800, if included, may include a central or covering area 810 and/or a peripheral or sealing area 820.

Figure 5:
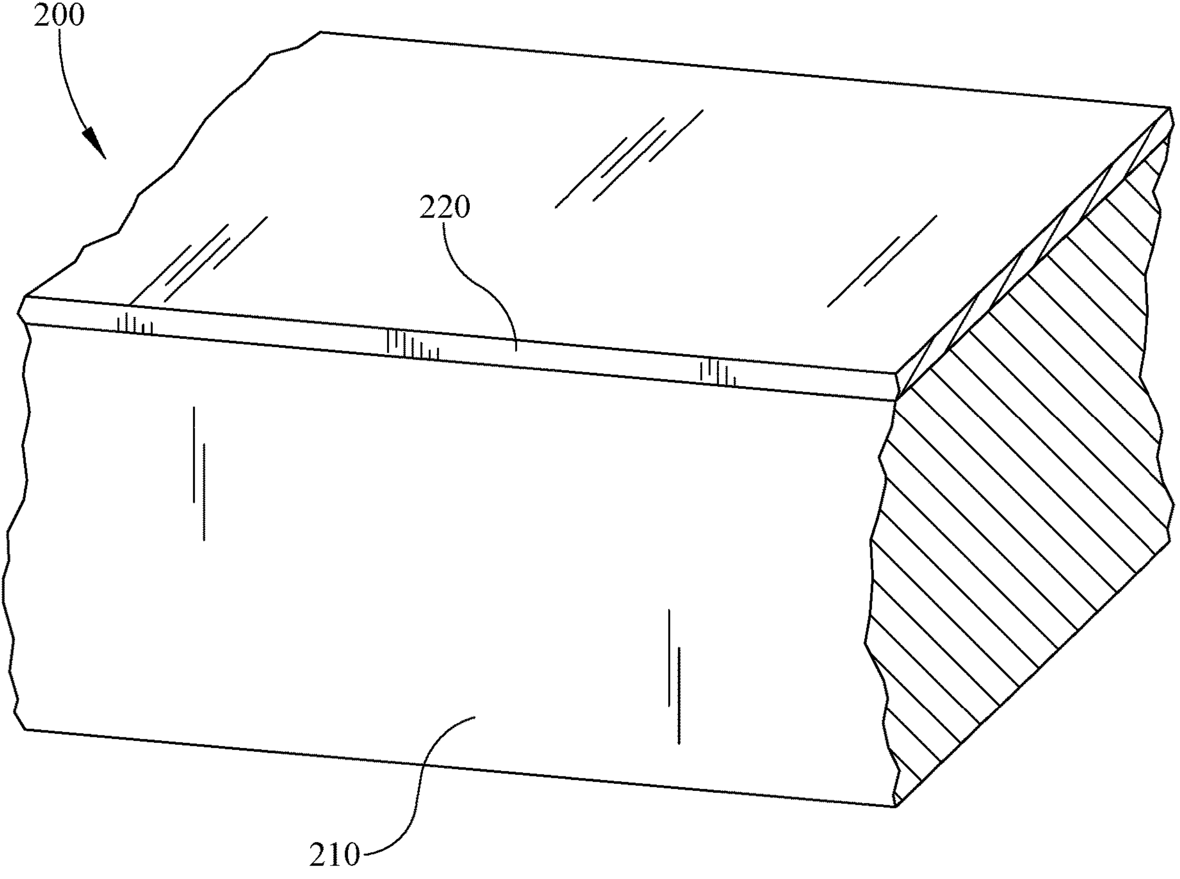
FIG. 5 illustrates a side perspective view of a portion of an embodiment of a laminate that may be used to form a container.
Figure 6:
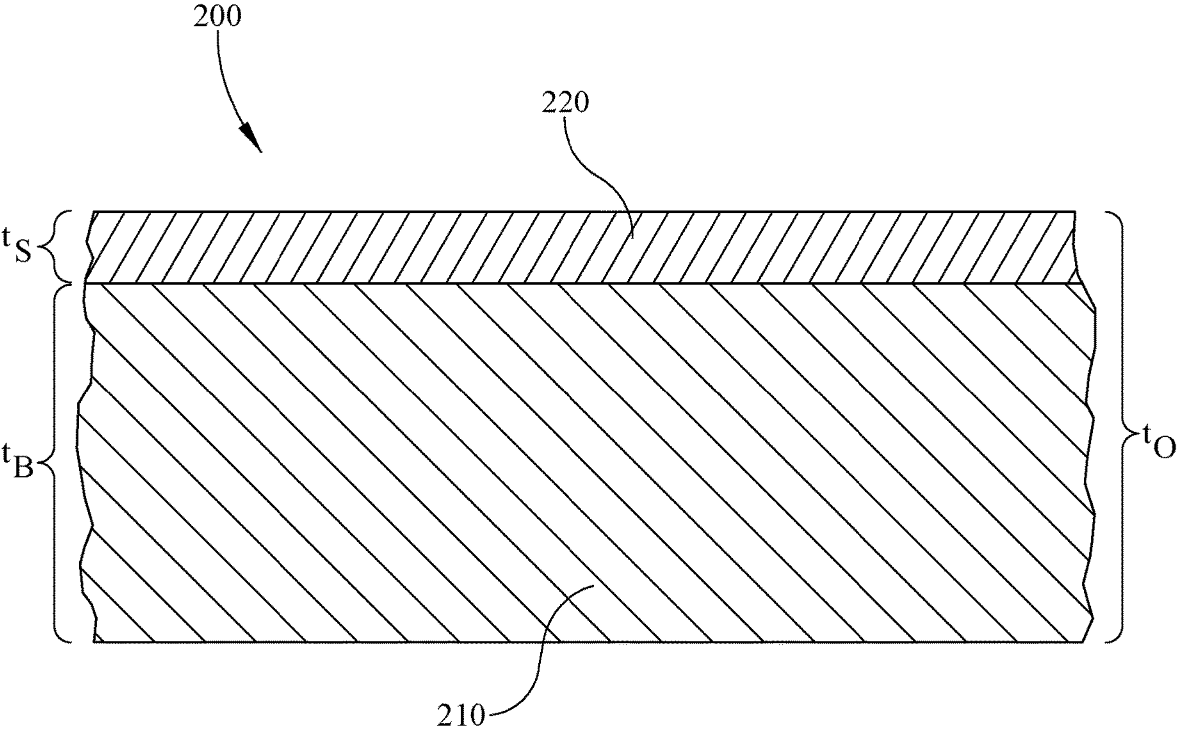
FIG. 6 illustrates a cross-section side view of the portion of laminate of FIG. 4.

Container 55, container 700, and/or other containers or parts may be formed from a laminate 200, for example, a portion of which is shown in FIGS. 5 and 6. Laminate 200 may include a base layer 210 and/or a film or sheet 220. Base layer 210 may be a substrate material and/or may form a significant portion of the structural support or component of container 55 or container 700, and/or package 50 or package 750. For example, base layer 210 may be a thermoplastic or other suitable material, such as, for example, polypropylene (PP), polyethylene (PE), polyethylene terephthalate (PET), polystyrene (PS), low density polyethylene (LDPE), high density polyethylene (HDPE), polylactic acid (PLA), bioplastic, and/or a generally recyclable, compostable, and/or biodegradable material. It is understood that base layer 210 may be formed of a material other than plastic or may include a mixture of plastic and non-plastic material. One or more sheets 220 and/or any other sheets or material may be included for any of a variety of reasons, such as, for example, providing barrier properties, aesthetic properties (e.g., a printed or printable layer), an in-mold label (IML), providing sealing material and/or a sealing area or surface, a tactile layer, and/or any other reason or combination thereof. In some embodiments, sheet 220 may include a gas barrier property or barrier layer such as an EVOH layer, for example, which may help to prevent or inhibit transmission of gases and/or fluids therethrough, and/or to protect or preserve contents stored in container 50 and/or container 700. Sheet 220 may be provided on an outside surface of container 50 or container 700, on an inside surface thereof, or both.

Sheet 220 may be bonded, laminated, adhered, and/or coupled to base layer 210 to form laminate 200. For example, sheet 220 may be formed substantially of a film, such as a blown film for example, which may be thermally bonded or otherwise bonded to base layer 210 to form laminate 200. In some examples, sheet 220 may include a cast film or extruded film, for example, instead of or in addition to a blown film. The relative thicknesses of the various components shown throughout the various figures are not necessarily to scale. For example, a blown film used to form sheet 220 may be relatively thin compared to base layer 210, and may be significantly thinner in relation to base layer 210 than is shown in the figures. Thicknesses of any layer of laminate 200, of laminate 200 as a whole (or of a disk 60 or of a blank 900, discussed more below), and/or of container 55 or container 700 shown in the various figures may not be to scale and may be exaggerated to illustrate the concepts described herein more clearly.

As shown in FIG. 6, sheet 220 may have a sheet thickness $t_S$, base layer 210 may have a base layer thickness $t_B$, and/or laminate 200 may have a laminate thickness $t_O$. Although shown in FIG. 6 as a single layer, base layer 210 and/or sheet 220 may include a plurality of layers. For example, sheet 220 may include three layers as shown for example in FIG. 7 or five layers as shown for example in FIG. 8. A three layer sheet 220 may be provided, for example, such that first layer 230 is a tie layer that may be used to bond second layer 240 to base layer 210. Third layer 250 may be an outer skin layer used, for example, to protect second layer 240 from the outside environment. For example, second layer 240 may be a barrier layer, such as an EVOH barrier layer, protected from the environment by an outer skin third layer 250 and bonded to base layer 210 by a tie first layer 230. Fourth layer 260 and/or fifth layer 270, or any other layers or features, may be added to provide any of a variety of other properties or support to laminate 200. In embodiments using a five layer structure of sheet 220, the outer layers or first layer 230 and fifth layer 270 may provide protection, sealing properties, desirable touch, and/or other features, while third layer 250 may provide a barrier layer and/or other feature, and second layer 240 and fourth layer 260 may be tie layers suitable for bonding, coupling, or attaching first layer 230 and/or fifth layer 270 to third layer 250. First layer 230 may be configured to seal, adhere, and/or tie to base layer 210, and/or fifth layer 270 may be configured to seal, adhered, and/or tie to a lid such as lid 100, for example. Sheet 220 may include virtually any number of layers, and the exemplary three layer and five layer structures shown in FIGS. 7 and 8, respectively, are merely provided as two examples of the number of layers that may be included in sheet 220.

Figure 7:
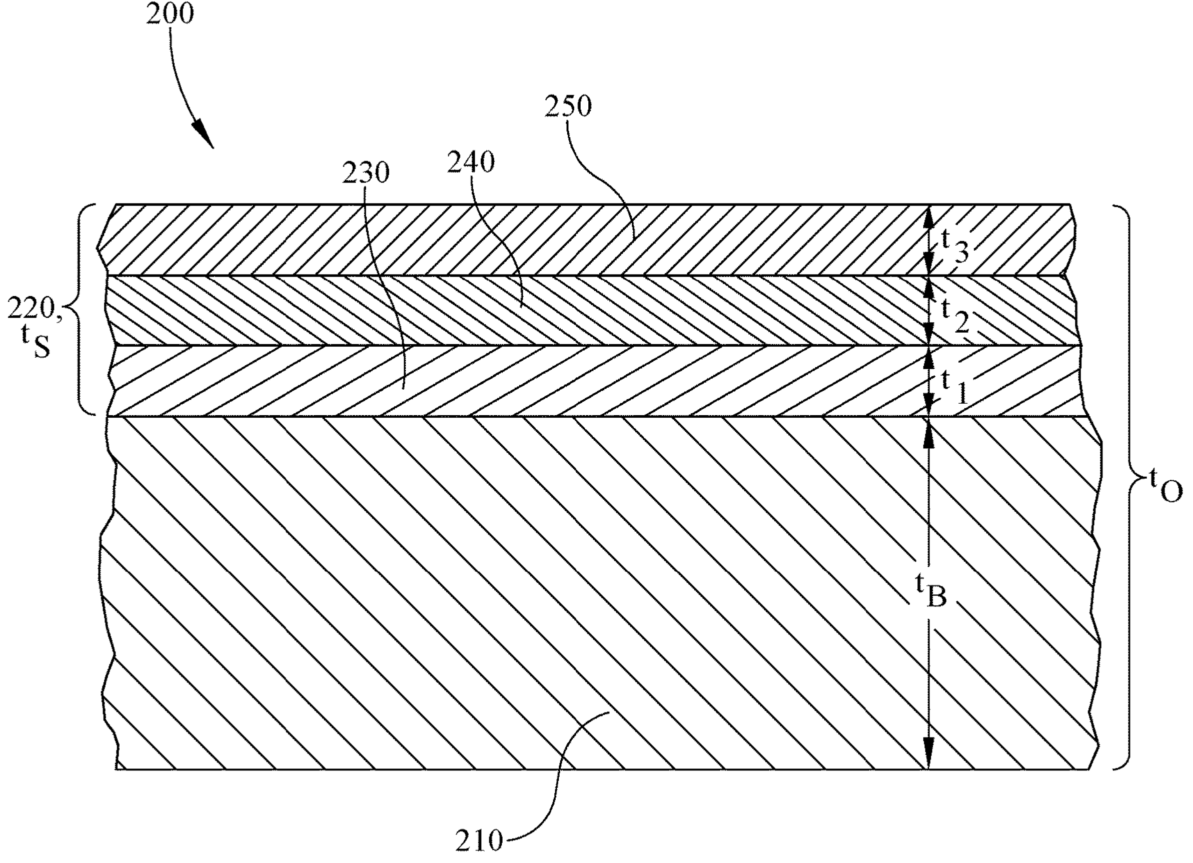
FIG. 7 illustrates a cross-section side view of another embodiment of a laminate, which has a base layer and a three layer sheet or film.
Figure 8:
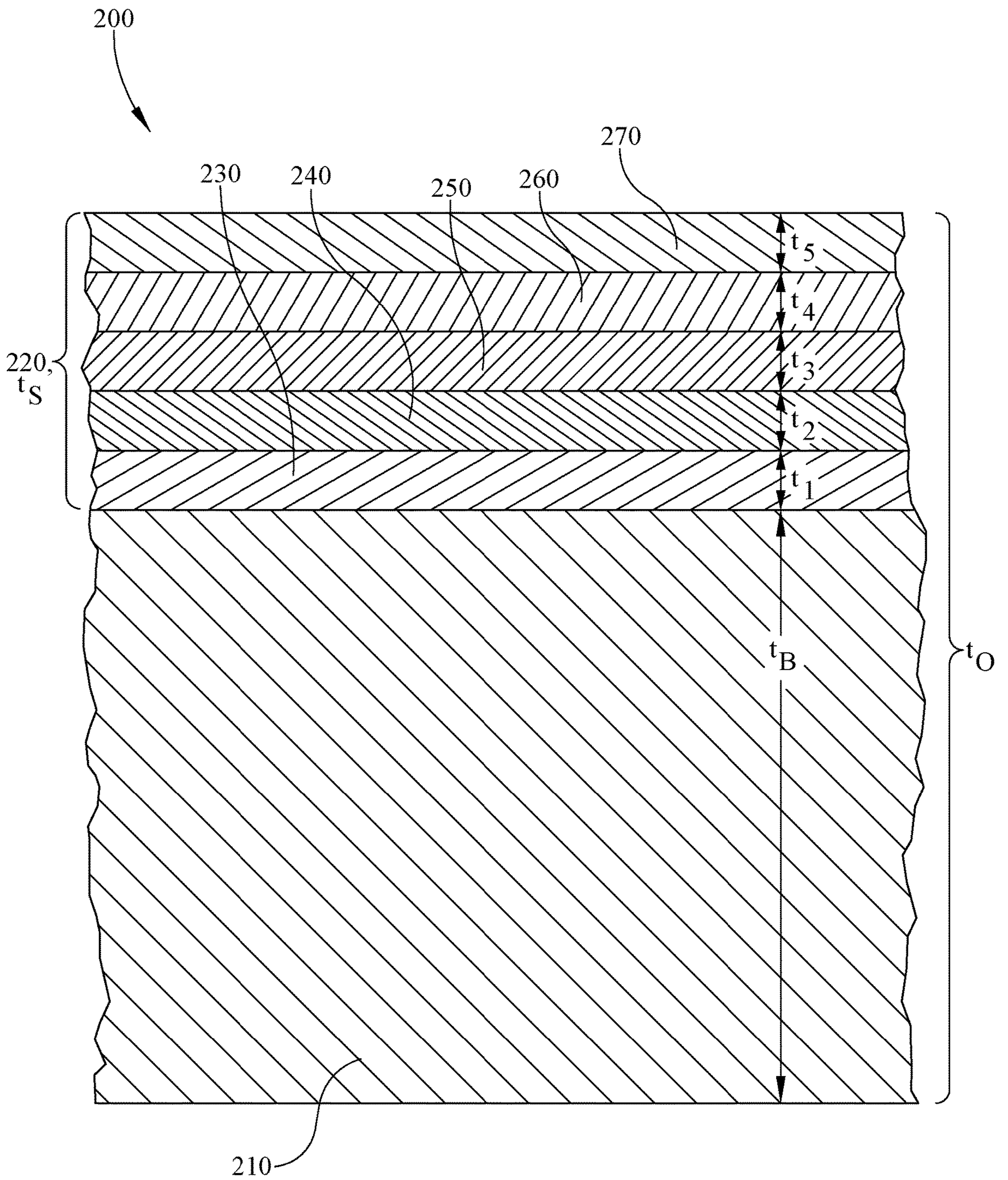
FIG. 8 illustrates a side view of a portion of yet another embodiment of a laminate.

Laminate 200 shown in FIG. 7 may include sheet 220 having sheet thickness $t_S$, with sheet 220 substantially formed of a first layer 230, a second layer 240, and/or a third layer 250. First layer 230 may have a first layer thickness $t_1$, second layer 240 may have a second layer thickness $t_2$, and/or third layer 250 may have a third layer thickness $t_3$, which may stack together to form sheet thickness $t_S$. Sheet thickness $t_S$ and base layer $t_B$ may stack together and/or form overall laminate thickness $t_O$. As shown in FIG. 8, sheet 220 may further include a fourth layer 260 and a fifth layer 270, having respective thicknesses $t_4$ and $t_5$, to form a five layer sheet 220.

One exemplary five layer structure may include first layer 230 that is configured to bond and/or laminate to base layer 210. For example, if base layer 210 is or includes PP, first layer 230 may also include PP to facilitate thermal lamination of base layer 210 to first layer 230. Third layer 250 may include EVOH to facilitate forming a barrier layer to prevent or inhibit gas transmission therethrough. Fifth layer 270 may be configured to be an outer skin or surface layer, and may for example include PP to give the outside surface similar characteristics as the inside surface formed by base layer 210. Second layer 240 and/or fourth layer 260 may be configured to act as a tie layer to facilitate bonding of first layer 230 and/or fifth layer 270 to third layer or barrier layer 250.

In one embodiment, base layer 210 may be formed substantially of PP, first layer 230 and/or fifth layer 270 may be formed of or include in significant amounts PP and/or copolymers suitable for lamination to base layer 210. Third layer 250 may be formed of, or include in an effective amount to serve as a barrier, EVOH. Second layer 240 and/or fourth layer 260 may be formed of, or include in an affective amount to serve as a tie layer between respective first layer 230 and/or third layer 270 and third layer 250, adhesive PP.

Sheet 220 and/or any of the component layers 230, 240, 250, 260, 270 may be made in any of a variety of ways. For example, sheet 220 may be or may include one or more blown films, and/or may be cast and/or coextruded, or may be made in any other way or virtually any variety thereof. It is understood that often it is possible to provide thinner films and/or layers within films when blowing the films as compared to coextruding the films. A blown film may be laminated to a substrate such as base layer 210, for example, as discussed herein. In an exemplary embodiment of laminate 200, for example used in the following examples, base layer 210 may have a thickness of about 10 mil or more and/or of about 20 mil or more. Base layer 210 may have a thickness in the range of about 20 mil to about 100 mil. Base layer 210 may have a thickness in the range of about 20 mil to about 60 mil, and/or in the range of about 40 mil to about 60 mil. Base layer 210 may have a thickness of about 20 mil, of about 30 mil, of about 32 mil, of about 40 mil, of about 44 mil, of about 45 mil, and/or of about 50 mil or more. It is understood that base layer 210 may be of any of a variety of thicknesses, and may have variable thickness throughout. It is further understood that the base layer thickness may be an average thickness of base layer 210.

In a first example of a film used to form sheet 220, a PP barrier sheet 220 was provided having five layers and an overall thickness of about 2.5 mil. First layer 230 and fifth layer 270, both formed including PP copolymer and suitable for bonding or laminating to a PP base layer 210, each had a thickness of about 0.800 mil, or about 32% of the overall thickness of sheet 220. Third layer 250, formed of EVOH, had a thickness of about 0.300 mil, or about 12% of the thickness of sheet 220. Second layer 240 and fourth layer 260, each formed of adhesive PP for tying the EVOH third layer 250 to first layer 230 and fifth layer 270, each had a thickness of about 0.300 mil or about 12% of the thickness of sheet 220. This example of PP barrier sheet 220 having a thickness of about 2.5 mil may be laminated to a base layer 210, for example, a base layer 210 including PP, having a base layer thickness of about 20 mil or more and/or of about 21.5 mil or more. For example, a 21.5 mil thick base layer 210 may be laminated with or to a 2.5 mil sheet 220 to form a 24 mil thick laminate 200, having an EVOH third layer 250 that is about 0.3 mil thick. In this example, the EVOH third layer 250 is about 1.25% of the thickness of the overall laminate thickness and the sheet 220 is about 10.4% of the overall laminate thickness. If the base layer 210 were made thicker than 21.5 mil in this example, the third layer 250 would account for less than about 1.25% of the overall laminate thickness and the sheet 220 would account for less than about 10.4% of the overall laminate thickness. In another example, a 2.5 mil sheet 220 may be laminated to a base layer 210 having a thickness in the range of about 40 mil to about 60 mil, about 44 mil to about 53.5 mil, about 44 mil to about 45 mil, and/or about 44.5 mil or about 52.5 mil, which may provide laminate 200 having a thickness of about 42.5 mil to about 62.5 mil, about 46.5 mil to about 56 mil, about 46.5 mil to about 47.5 mil, and/or about 47 mil or about 55 mil.

In a second example of a film used to form sheet 220 suitable for lamination with a PP base layer 210, a blown film was used to provide sheet 220 having an overall thickness of about 3.75 mil. In the second example, the layers were substantially similar to the corresponding layers of the first example in order and in composition. First layer 230, second layer 240, third layer 250, fourth layer 260, and fifth layer 270 had respective relative thicknesses of 32%, 12%, 12%, 12%, and 32%. Given the thicker sheet 220 used in the second example as compared to the first example, each layer was thicker in the second example using a 3.75 mil sheet 220: first layer 230 had a thickness of about 1.200 mil, second layer 240 had a thickness of about 0.450 mil, third layer 250 had a thickness of about 0.450 mil, fourth layer 260 had a thickness of about 0.450 mil, and fifth layer 270 had a thickness of about 1.200 mil. This example of PP barrier sheet 220 having a thickness of about 3.75 mil may be laminated to a base layer 210, for example, a base layer 210 including PP, having a base layer thickness of about 30 mil or more, about 32 mil or more, and/or of about 35 mil or more. For example, a 32.25 mil thick base layer 210 may be laminated with or to a 3.75 mil sheet 220 to form a 36 mil thick laminate 200, having an EVOH third layer 250 that is about 0.45 mil thick. In this example, the EVOH third layer 250 is about 1.25% of the thickness of the overall laminate thickness and the sheet 220 is about 10.4% of the overall laminate thickness. If the base layer 210 were made thicker than 32.25 mil in this example, the third layer 250 would account for less than about 1.25% of the overall laminate thickness and the sheet 220 would account for less than about 10.4% of the overall laminate thickness.

In a third example of a film used to form sheet 220 suitable for lamination with a PP base layer 210, a blown film was used to provide sheet 220 having an overall thickness of about 5.0 mil. In the third example, the layers were substantially similar to the corresponding layers of the first example in order and in composition. First layer 230, second layer 240, third layer 250, fourth layer 260, and fifth layer 270 had respective relative thicknesses of 32%, 12%, 12%, 12%, and 32%. Given the thicker sheet 220 used in the third example as compared to the first example, each layer was thicker in the second example using a 5.0 mil sheet 220: first layer 230 had a thickness of about 1.600 mil, second layer 240 had a thickness of about 0.600 mil, third layer 250 had a thickness of about 0.600 mil, fourth layer 260 had a thickness of about 0.600 mil, and fifth layer 270 had a thickness of about 1.600 mil. This example of PP barrier sheet 220 having a thickness of about 5.0 mil may be laminated to a base layer 210, for example, a base layer 210 including PP, having a base layer thickness of about 40 mil or more and/or of about 45 mil or more. For example, a 43 mil thick base layer 210 may be laminated with or to a 5.0 mil sheet 220 to form a 48 mil thick laminate 200, having an EVOH third layer 250 that is about 0.6 mil thick. In this example, the EVOH third layer 250 is about 1.25% of the thickness of the overall laminate thickness and the sheet 220 is about 10.4% of the overall laminate thickness. If the base layer 210 were made thicker than 32.25 mil in this example, the third layer 250 would account for less than about 1.25% of the overall laminate thickness and the sheet 220 would account for less than about 10.4% of the overall laminate thickness.

In a fourth example of a film used to form sheet 220 suitable for lamination with a PE base layer 210, a blown film was used to provide sheet 220 having an overall thickness of about 3.75 mil. In the fourth example, the layers were substantially similar to the corresponding layers of the first example in order and in thickness but varied in composition to facilitate lamination with a PE base layer 210. In this fourth example, first layer 230 and fifth layer 270 were formed substantially of LDPE, while second layer 240 and fourth layer 260 were formed substantially of an adhesive linear low density polyethylene (LLDPE) suitable for bonding with an EVOH barrier third layer 250. First layer 230, second layer 240, third layer 250, fourth layer 260, and fifth layer 270 had respective relative thicknesses of 32%, 12%, 12%, 12%, and 32%. Each layer in the fourth example had the following approximate thicknesses: first layer 230 had a thickness of about 1.200 mil, second layer 240 had a thickness of about 0.450 mil, third layer 250 had a thickness of about 0.450 mil, fourth layer 260 had a thickness of about 0.450 mil, and fifth layer 270 had a thickness of about 1.200 mil. This example of PE barrier sheet 220 having a thickness of about 3.75 mil may be laminated to a base layer 210, for example, a base layer 210 including PE, having a base layer thickness of about 30 mil or more, of about 32 mil or more, and/or of about 35 mil or more. It is understood that the first, second, third, and fourth examples provided above, along with the sub-examples therein regarding the base layer 210, respectively, could be modified to materials other than PP or PE, such as, for example, PET, LDPE, HDPE, PS, PLA, bioplastics, and/or other suitable plastics materials or other materials, or any combination thereof.

An EVOH barrier layer or third layer 250 may be about 5% or more of the thickness of sheet 220. Any of the layers used in sheet 220 may be about 1% to about 100% of the thickness of sheet 220. Any of the layers used in sheet 220 may be about 0.03 mil or more, about 0.10 mil or more, and/or about 0.3 mil or more. In some multilayer sheet structures, for example, any of the layers therein may have a thickness between about 2% and about 99% of the thickness of sheet 220, and/or between about 10% and about 80% of the thickness of sheet 220. Either or both outer layers of sheet 220, such as first layer 230 and fifth layer 270 in the examples above, may have a thickness that is in the range of about 10% to about 50% of sheet 220, in the range of about 15% to about 40% of the thickness of sheet 220, in the range of about 20% to about 35% of the thickness of sheet 220, in the range of about 25% to about 35% of the thickness of sheet 220, and/or about 32% of the thickness of sheet 220. Any or all of the inner layers, such as second layer or tie layer 240, fourth layer or tie layer 260, and third layer or barrier layer 250 in the above examples, may have a thickness in the range of about 1% to about 30% of the thickness of sheet 220, in the range of about 5% to about 20% of the thickness of sheet 220, in the range of about 5% to about 15% of the thickness of sheet 220, in the range of about 10% to about 15% of the thickness of sheet 220, and/or of about 12% of the thickness of sheet 220.

Sheet 220 may have a thickness of about 0.5 mil or more. Sheet 220 may have a thickness in the range of about 0.5 mil to about 100 mil. Sheet 220 may have a thickness in the range of about 1.0 mil to about 50 mil. Sheet 220 may have a thickness in the range of about 1.0 mil to about 20 mil. Sheet 220 may have a thickness in the range of about 1.0 mil to about 10 mil. Sheet 220 may have a thickness in the range of about 1.0 mil to about 8.0 mil. Sheet 220 may have a thickness in the range of about 2.0 mil to about 6.0 mil. Sheet 220 may have a thickness in the range of about 2.0 mil to about 5.0 mil. In some embodiments, sheet 220 may have a thickness in the range of about 2.0 mil to about 3.0 mil. In some embodiments, sheet 220 may have a thickness in the range of about 3.0 mil to about 4.5 mil. In some embodiments, sheet 220 may have a thickness in the range of about 4.0 mil to about 6.0 mil. Sheet 220 may have a thickness of about 2.5 mil. Sheet 220 may have a thickness of about 3.75 mil. Sheet 220 may have a thickness of about 5.0 mil.

First layer 230 may have a thickness in the range of about 0.2 mil to about 5 mil. First layer 230 may have a thickness in the range of about 0.2 mil to about 2 mil. First layer 230 may have a thickness in the range of about 0.8 mil to about 1.6 mil. Second layer 240 may have a thickness in the range of about 0.1 mil to about 2 mil. Second layer 240 may have a thickness in the range of about 0.2 mil to about 1 mil. Second layer 240 may have a thickness in the range of about 0.3 mil to about 0.6 mil. Third layer 250 may have a thickness in the range of about 0.1 mil to about 2 mil. Third layer 250 may have a thickness in the range of about 0.2 mil to about 1 mil. Third layer 250 may have a thickness in the range of about 0.3 mil to about 0.6 mil. Fourth layer 260 may have a thickness in the range of about 0.1 mil to about 2 mil. Fourth layer 260 may have a thickness in the range of about 0.2 mil to about 1 mil. Fourth layer 260 may have a thickness in the range of about 0.3 mil to about 0.6 mil. Fifth layer 270 may have a thickness in the range of about 0.2 mil to about 5 mil. Fifth layer 270 may have a thickness in the range of about 0.2 mil to about 2 mil. Fifth layer 270 may have a thickness in the range of about 0.8 mil to about 1.6 mil.

The example thicknesses listed above are provided for illustrative purposes and are merely exemplary. It is understood that other thicknesses, other layers, more or less layers, other order or sequence of layers, and other variations could be used. Moreover, it is understood that the thicknesses may be measured either before or after forming a part, such as container 55 or container 700, although the example measurements listed above are taken with respect to the blown film sheet 220 prior to lamination to base layer 210 and prior to forming into a part such as container 55 or container 700. It is further understood that thickness measurements for a given element or component may be calculated or measured at a given point or location, and/or an average thickness of that element or component or of a portion or subset of that element component may be measured or calculated.

Figure 9:
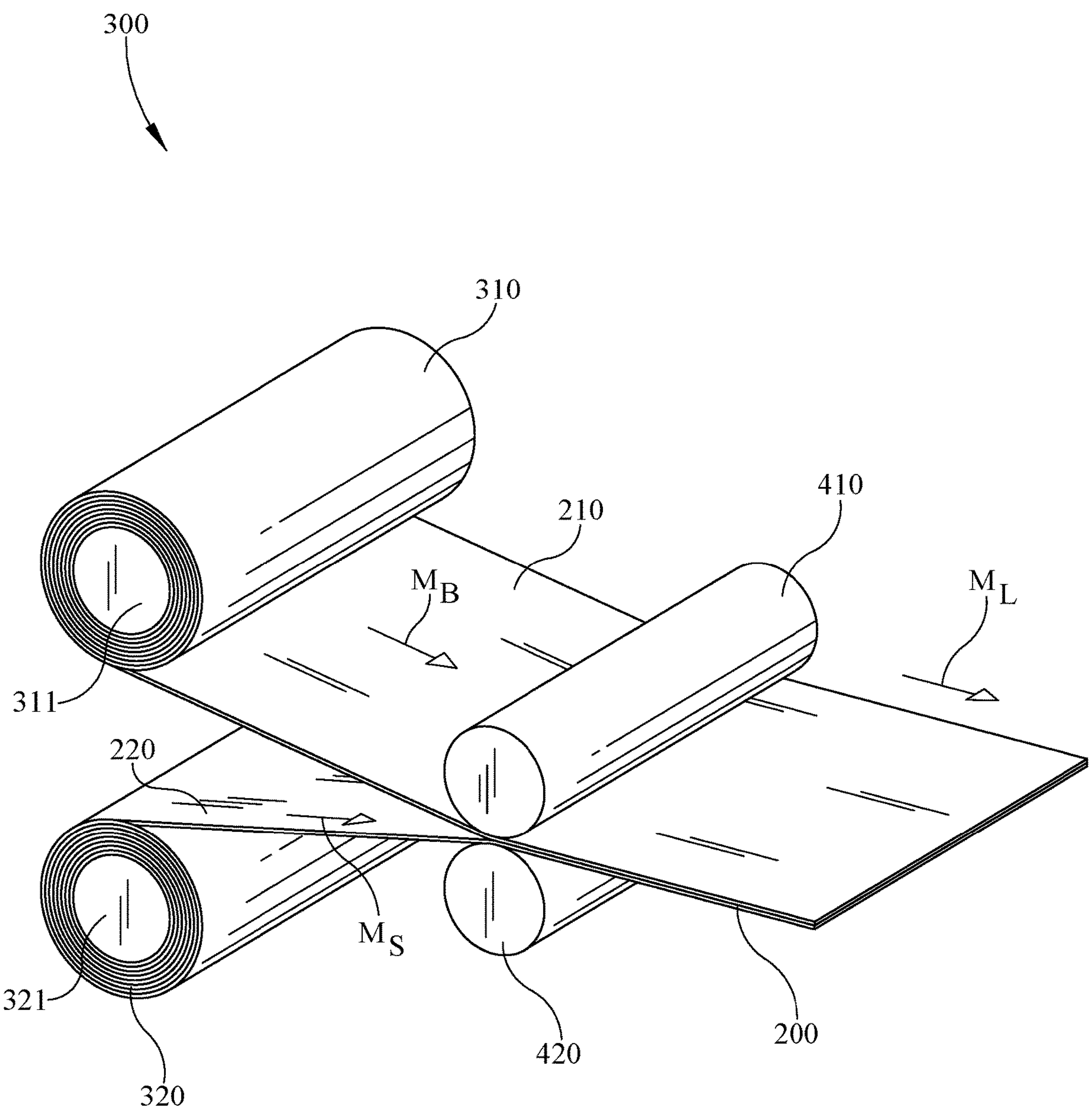
FIG. 9 illustrates an embodiment of a laminate forming apparatus and process.

Laminate 200 may be formed, for example, by laminating or bonding sheet 220 to base layer 210, as shown in an example illustration of a laminating process in FIG. 9. Base layer 210 may be provided in a roll 310 on a first roller 311 or otherwise provided in base layer movement direction $M_B$. For example, base layer 210 may be extruded or coextruded and then proceed in base layer movement direction $M_B$ directly and/or without being first provided in roll 310 or without being provided on first roller 311. Sheet 220 may be provided in a roll 320 on a second roller 321 or otherwise provided in sheet movement direction $M_S$. For example, sheet 220 may be extruded, coextruded, cast, blown, or otherwise formed and then proceed in sheet movement direction $M_S$ directly and/or without being first provided in roll 320 or without being provided on second roller 321. Sheet 220 may be formed, for example, in a blowing operation as discussed herein and then be provided for lamination with base layer 210 from roll 320 and/or from second roller 320. Sheet 220 may be provided in sheet movement direction $M_S$ from roll 310 while base layer 210 may be provided in base layer movement direction $M_B$ directly from an extrusion process and/or roll 310 may be bypassed or omitted, for example.

An upper roller 410 and/or a lower roller 420 may be provided to press, heat, and/or bond base layer 210 to sheet 220 to form laminate 200 moving in laminate movement direction $M_L$. Laminate 200 may be stored for later processing, for example, thermoforming as shown for example in FIG. 10, or laminate 200 may travel in laminate movement direction $M_L$ directly to a formation process such as thermoforming or any other process. It is understood that any of a variety of processes and/or mechanisms may be used to form laminate 200 and/or bond, attach, or couple base layer 210 and sheet 220, and the thermal laminating roller process depicted in FIG. 9 is merely an illustration of one such process. It is further understood that while base layer 210 is shown on top of sheet 220 in FIG. 9, sheet 220 could be provided on top of or above base layer 210, side by side, and/or in virtually any orientation for laminating or for any other purpose.

Figure 10:
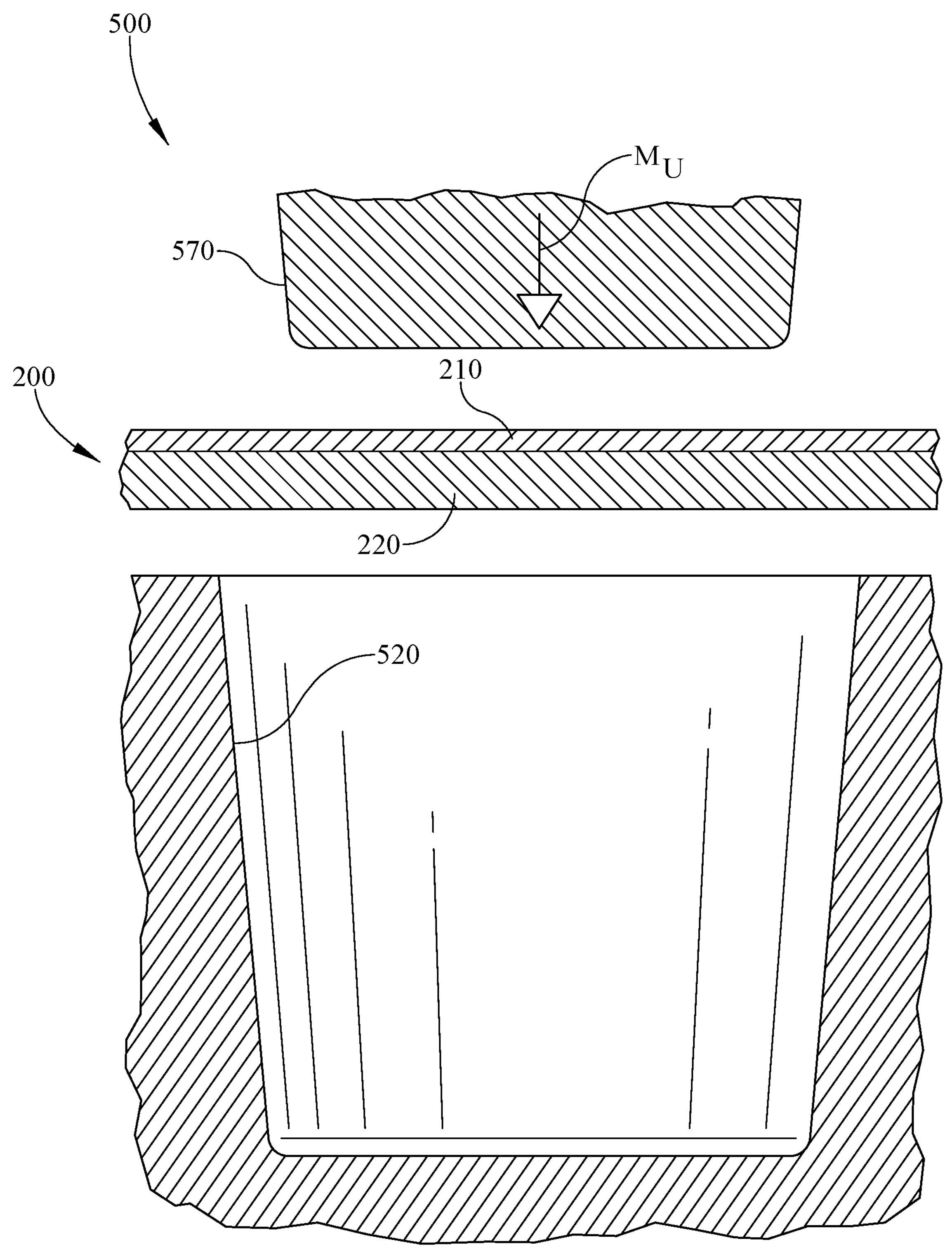
FIG. 10 illustrates an embodiment of a thermoforming apparatus and process.

As shown in FIG. 10, laminate 200 may be processed and/or formed in a formation process or by a formation apparatus 500. For example, an upper mold 510 and/or a lower mold 520 may be used to form laminate 200 from a first state in which it is a relatively flat portion of material into a second state in which it is formed into a part having additional depth. For example, formation apparatus 500 may be or may include a thermoforming machine or apparatus. In the embodiment shown in FIG. 10, laminate 200 may be formed and/or thermoformed by upper mold 510 moving downwardly in upper mold movement direction Mu to press laminate 200 down into lower mold 520 or a cavity thereof, or vice versa, and give laminate 200 a formed shape.

Figures 14, 15, 16:
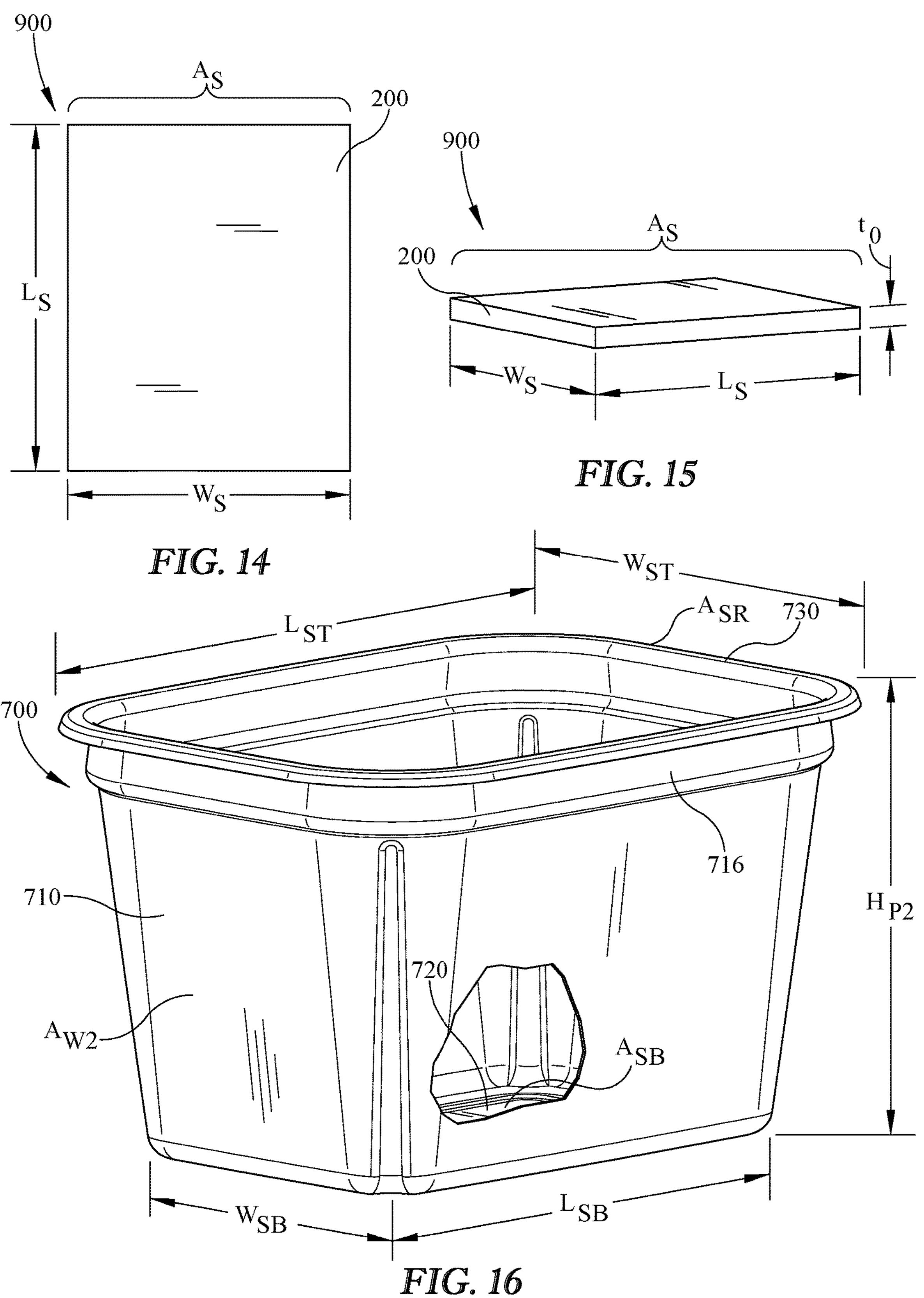
FIG. 14 illustrates a top view of another embodiment of a portion of a sheet in blank form suitable for use in a forming process.
FIG. 15 illustrates a side perspective view of the blank of FIG. 14.
FIG. 16 illustrates a side perspective view of another embodiment of a part or container formed from the portion of sheet in blank form of FIGS. 14 and 15.

Laminate 200 may be provided in a shape to form a desired part, such as a generally round or circular disk 60 shown in FIGS. 11 and 12 used to form the generally cylindrical container 55 shown for example in FIGS. 1, 2, and 13. Alternatively, laminate 200 may be provided as a generally square or rectangular blank 900 as shown in FIGS. 14 and 15 used to form the generally rectangular container 700 shown for example in FIGS. 3, 4, and 16. Disk 60 and/or blank 900 may be a piece or portion of a larger laminate 200 prior to being formed into a part such as container 55 or container 700, and may be still attached to the larger laminate 200 rather than being clearly delineated as is shown in FIGS. 11, 12, 14, and 15 for example. These figures show disk 60 and blank 900 as separate from the rest of laminate 200 prior to forming for ease of illustration of the principles discussed herein. For example, a plurality of parts such as container 55 and/or container 700 may be formed from one laminate 200 through a thermoforming process having a plurality of molds operating at once, as is understood by one of ordinary skill in the art.

Disk 60, provided from at least a portion of laminate 200, may have a disk diameter $D_O$, an original laminate area or sheet area or disk area $A_O$ including an area of laminate 200 used to form container 55, and/or thickness $t_O$. Disk 60 may be formed into a generally cylindrically shaped container 55 shown for example in FIG. 13. A generally cylindrical container 55 with a generally truncated cone-shaped side wall 10, may be formed from either or both molds or other forming structure such as upper mold 510 and lower mold 520 shown in FIG. 10. Container 55 may have bottom 20 having a bottom diameter $D_B$ and/or a bottom area $A_B$, side wall 10 having side wall area $A_{W1}$, and/or flange or rim 30 having rim area $A_R$. Container 55 may have an overall height or part height $H_{P1}$. FIG. 13 is shown with side wall 10 partially cut out to illustrate bottom 20.

Alternatively or additionally, blank 900, provided from laminate 200, may have a blank length $L_S$ and/or a blank width $W_S$, an original laminate area or sheet area or blank area $A_S$ including an area of laminate 200 used to form container 700, and/or a thickness $t_O$. Blank area $A_S$ may be calculated by multiplying blank length $L_S$ and blank width $W_S$. Blank 900 may be formed into a generally rectangular shaped container 700 shown for example in FIG. 16. A generally rectangular container 700 with a generally truncated pyramid-shaped side wall 710, may be formed from either or both molds or other forming structure such as upper mold 510 and lower mold 520 shown in FIG. 10. Container 700 may have bottom 720 having a bottom length $L_{SB}$ and/or a bottom width $W_{SB}$ and/or a bottom area $A_{SB}$, side wall 710 having side wall area $A_{W2}$, and/or flange or rim 730 having rim area $A_{SR}$. Container 700 may have an overall height or part height $H_{P2}$. FIG. 16 is shown with side wall 710 partially cut out to illustrate bottom 720.

The relative size of the formed part, such as container 55 or container 700, as compared to the portion of laminate 200 used to form them, such as disk 60 or blank 900, respectively, may be used to evaluate the draw ratio of a formed part such as container 55 or container 700, for example. For a generally cylindrical part such as container 55, part height $H_{P1}$ and disk diameter $D_O$ or top diameter $D_T$ may be used to determine the depth of draw ratio or linear draw ratio, and/or the area of sheet or disk area $A_O$ and bottom area $A_B$, side wall area $A_S$, and/or rim area $A_R$ may be used to determine the areal draw ratio. An unexpected result was the depth of draw ratios that were able to be achieved without any layer breakage or failure, and maintained barrier integrity, with the relatively thin layer(s) in sheet 220 in container 55. These unexpected results were achieved through laminating sheet 220 to base layer 210, allowing thinner layers, which were still able to be drawn relatively deeply for forming container 55.

Laminate 200 formed with base layer 210 and blown film sheet 220 as discussed for example in the various examples above, was able to have relatively thin layers (e.g., EVOH third layer 250 of about 12% of the thickness of sheet 220 and/or EVOH third layer 250 having a thickness of about 0.3 mil to about 0.6 mil) and still be effective for relatively high draw ratios as used for example in thermoforming. These results were unexpected because trends in the industry suggest that thicker layers such as EVOH are needed to achieve relatively high draw ratios as are associated with forming beverage pods or containers, and these trends teach away from the thinning of material used in the examples above. In an exemplary embodiment, a container 55 was formed having a sheet thickness $t_S$ after forming of about 1.03 mil, formed from a 3.75 mil sheet 220, an overall laminate thickness to after forming of about 28.38 mil, and a base layer thickness $t_B$ after forming of about 27.35 mil. Relatively thin layers may, for example, facilitate recycling or recyclability of container 55, package 60, and/or laminate 200, or any combination thereof. A relatively thin sheet 220 on a relatively thick base layer 210 may reduce the relative amount of sheet 220 materials in laminate 200. For example, a base layer 210 may be made of PP or PE or other suitable recyclable material, and after laminate 200 is formed with sheet 220 having other materials such as an EVOH third layer 250, laminate 200, container 55, and/lid 100 or package 60 may have sufficiently low volume and/or weight of other materials that it still may be recycled along with base layer 210. For example, less than about 5% and/or less than about 3% of laminate 200, container 55, and/or package 60 may contain material other than that found in base layer 210 (e.g., EVOH with a PP or PE base layer 210). It is understood that the volume of material may approximately correspond to the thickness of the layer that material is found in. For example, if a given layer has a thickness less than 5% of the overall laminate thickness, then the volume of that layer, or the material used to form that layer, also may account for less than approximately 5% of the volume of the overall laminate, or the material used to form the laminate.

Two common types of draw ratio calculations used in plastic manufacturing are linear draw ratio and areal draw ratio. Linear draw ratio may compare the height and length or width of a formed part with the material used to form it. For example, for a generally cylindrical part formed from a generally circular portion of sheet, height to diameter, or H:D, which is a measure of height divided by diameter, may be used to calculate the linear draw ratio. Areal draw ratio may compare the area of a formed part to the area of the material used to form it, which may be expressed as $A_P$:$A_O$, or the area of the formed part divided by the area of the initial material or portion of material used to form the part (see, e.g., Throne, James L. *Technology of Thermoforming*. Hanser Publications, 1996, pp. 488-498).

Linear draw ratio based on diameter may be a way to measure a substantially cylindrical part, such as container 55, formed from a substantially circular sheet 220 or circular portion of sheet 220. Such a linear draw ratio may be expressed mathematically as:

$$R_C = H \div D$$

Areal draw ratio may be used for any of a variety of part shapes virtually without limitation because it is a comparison of the surface area of the formed part to the surface area of the portion of material or sheet used to form it. Areal draw ratio may be expressed mathematically as:

$$R_A = A_P \div A_O$$

where $A_P$ is the area of the formed part and $A_O$ is the area of the portion of sheet 220 used to form the part. Areal draw ratio may be used to measure a generally cylindrical part, such as container 55, formed from a substantially circular portion of sheet 220, such as disk 60, as well. Area draw ratio may also be used with other shapes too, such as generally rectangular container 700 formed from substantially rectangular blank 900 as shown for example in FIGS. 14 through 16.

The area of a generally cylindrical part such as container 55 shown in FIG. 13 may be the sum of the parts, such as side wall 10, bottom 20, and rim 30. The area of a generally cylindrical part such as container 55 shown in FIG. 13 may be the sum of the parts, such as side wall 10, bottom 20, and rim 30. The area of a generally circular portion of sheet 220 used to form container 55 may be generally the area of a circle, $A_O=\pi r^2$. The areal draw ratio of a truncated cylinder formed from a circular sheet may be expressed as:

$$R_A = \left(\frac{r}{R}\right)^2 + \left\{1 + \left(\frac{r}{R}\right) \times \left[\left(1 - \frac{r}{R}\right)^2 + \left(\frac{h}{R}\right)^2\right]^{\frac{1}{2}}\right.$$

where R is the major radius or top radius (which may be calculated with or without the rim or flange 30, as discussed more below), r is the minor radius or bottom radius and h is the height. For instance, referring to container 55 shown in FIG. 11, the value for R in the above areal draw ratio equation would be half of the top diameter $D_T$, or $$\frac{D_T}{2},$$

the value for r would be half the bottom diameter $D_B$, or $$\frac{D_B}{2},$$

and the value for h would be $H_{P1}$. It is understood that other equations may be used for other part shapes, such as a cube or a truncated pyramid, for example, or for virtually any other shape. The equation above for calculating the areal draw ratio of a truncated cylinder, may be found for example in *Technology of Thermoforming* (Throne, James L. *Technology of Thermoforming*. Hanser Publications, 1996, pp. 488-491), along with other areal draw ratio equations for other part or container shapes.

Alternatively or additionally, the areal draw ratio of a part may be measured or calculated by measuring the surface area of the formed part and comparing it to the surface area of the disk, blank, or other portion of material used to form it. For example, computer software such as CAD may be used to measure surface area of the part, or of each surface feature and the surface area of the various features could be added together to arrive at the total surface area. In the case of container 700, for example, it may be more efficient and/or more accurate to use CAD or the like to measure the surface area of each feature such as side wall 710, bottom 720, flutes 715, shoulder 716, and rim 730, add them together, and divide the sum by the area of blank 900 to arrive at the areal draw ratio. Using CAD may be more accurate, for example, by accounting for surface features that mathematical equations approximately a general shape (e.g., a truncated cone or truncated pyramid) might not account for. The approach of using CAD or other programs to measure surface area could be used with container 55 and disk 60 as well, and any components or surface features thereof, such as bottom 20 having ribs or the like.

For example, CAD was used to measure the disk area $A_0$ of disk 60 shown in FIG. 11 as well as the surface area of container 55, including rim area $A_R$, area of shoulder 16, side wall area $A_{W1}$ and bottom area $A_B$. In this example, $D_0$ is about 2", $D_T$ is also about 2", $H_{P1}$ is about 1.75", and $D_B$ is about 1.43". The disk area $A_0$ is about 3.142 in$^2$, measured using CAD, and the formed part surface area measuring the outside surface of any given feature, measuring using CAD, shows a total formed part surface area of about 11.012 in$^2$. Dividing the total formed part surface area by the disk area $A_0$ yields an areal draw ratio in this first example of about 3.505 (11.012 divided by 3.142). The linear draw ratio in this example, $H_{P1}$ divided by $D_0$, is about 0.875 (1.75 divided by 2).

In another example, CAD was used to measure the blank area $A_S$ shown in FIG. 14 as well as the surface area of container 750, including rim area $A_{SR}$, area of shoulder 716, side wall area $A_{W2}$, and bottom area $A_{SB}$. In this second example, $A_{SR}$ is about 10.2 in$^2$, with a top length $L_{ST}$ of about 3.75" and a top width $W_{ST}$ of about 2.72", $A_{SB}$ is about 5.78 in$^2$, with a bottom length $L_{SB}$ of about 2.92" and a bottom width $W_{SB}$ of about 1.98". Height $H_{P2}$ of container 750 in this example is about 2.25". CAD was used to measure blank area $A_S$ and also that of formed part or container 700, showing a blank area $A_S$ of about 10.2 in$^2$ and a formed part surface area of about 30.4 in$^2$. Dividing the total formed part surface area by the blank area $A_S$ yields an areal draw ratio in this second example of about 2.98 (30.4 divided by 10.2).

In some embodiments of container 55, formed with laminate 200 for example as discussed above, a linear draw ratio may be greater than about 0.4, in the range of about 0.4 to about 2.0, in the range of about 0.5 to about 1.5, in the range of about 0.6 to about 1.2, in the range of about 0.8 to about 1.0, and/or about 0.9.

In some embodiments of container 55 or of container 700, formed with laminate 200, for example, as discussed above, an areal draw ratio may be equal to or greater than about 2.5, equal to or greater than about 2.98, equal to or greater than about 3.0, equal to or greater than about 3.1, equal to or great than about 3.25, equal to or greater than about 3.4, equal to or greater than about 3.5, in the range of about 2.5 to about 20.0, in the range of about 2.5 to about 10.0, in the range of about 2.5 to about 9.0, in the range of about 2.9 to about 6.0, in the range of about 2.9 to about 5.0, in the range of about 3.25 to about 5.0, in the range of about 3.4 to about 5.0, in the range of about 3.5 to about 5.0, about 2.98, and/or about 3.5. It is understood that the linear draw ratio and areal draw ratio may be estimates based on relatively simplified geometries, and that more complex geometries and/or features of container 55, such as for example shoulder 16, rim 30, shoulder 16 or other features or any combination thereof may affect the draw ratio.

In another example, container 55 may have a height $H_{P1}$ of about 1.7", a bottom diameter $D_B$ of about 1.1", a top diameter $D_T$ including the rim or flange 30 of about 2", or a top diameter $D_T$ excluding the rim or flange 30 of about 1.8". In this example, the flange or rim 30 is about 0.1" wide from an inside edge adjacent the opening into container 55 to an outside edge, which is opposite the inside edge. Based on this example, and using the equation above for areal draw ratio $R_A$ of a truncated cone, the major radius R (half the top diameter $D_T$) may be about 1", while the minor radius r may be measured at half the bottom diameter $D_B$, or about 0.55", and the height h or $H_{P1}$ may be measured at about 1.7".

In calculating draw ratios such as areal draw ratio, it is understood that the thickness may be relatively small compared to the surface area such that the thickness may be negligible in calculating the draw ratio. In such an instance, the inner surface is approximately equal in area to the outer surface, and the draw ratio calculation is approximately the same whether measuring and comparing all surfaces, or just the top or bottom surface. The exemplary ratios provided herein are approximations and in general any difference that might arise depending on which surfaces are compared are generally negligible, as is readily apparent to a person of ordinary skill in the art. For example, in considering the areal draw ratio of container 55 compared to disk 60, the draw ratio calculation will be approximately equal whether (1) comparing the sum of the areas of the top surface, bottom surface and sides surfaces of disk 60 to the area of all surfaces of container 55 or (2) comparing the top (or bottom) surface area of disk 60 to the sum of the top (or bottom) surface areas of container 55. The same may be said for container 700 as compared to blank 900. The areal draw ratios discussed herein may be calculated either from the total surface area comparison of the disk or blank to the formed part (e.g., including the top and bottom surfaces of the disk or blank in the area of the disk $A_0$ or $A_S$ and comparing that area to the surface area of all surfaces of the formed part), or from the comparison of one side of the disk or blank to that same side after the part has been formed. It is understood that if the area of the disk or blank is doubled as might be the case by measuring the top and bottom surface areas rather than just the top or the bottom surface area, and the area of the formed part is doubled by measuring all top and bottom surfaces rather than just one side or the other, the resulting areal draw ratio is likely approximately the same because doubling the numerator and doubling the denominator in this ratio will cancel out because two in the numerator divided by two in the denominator is one.

Figure 17:
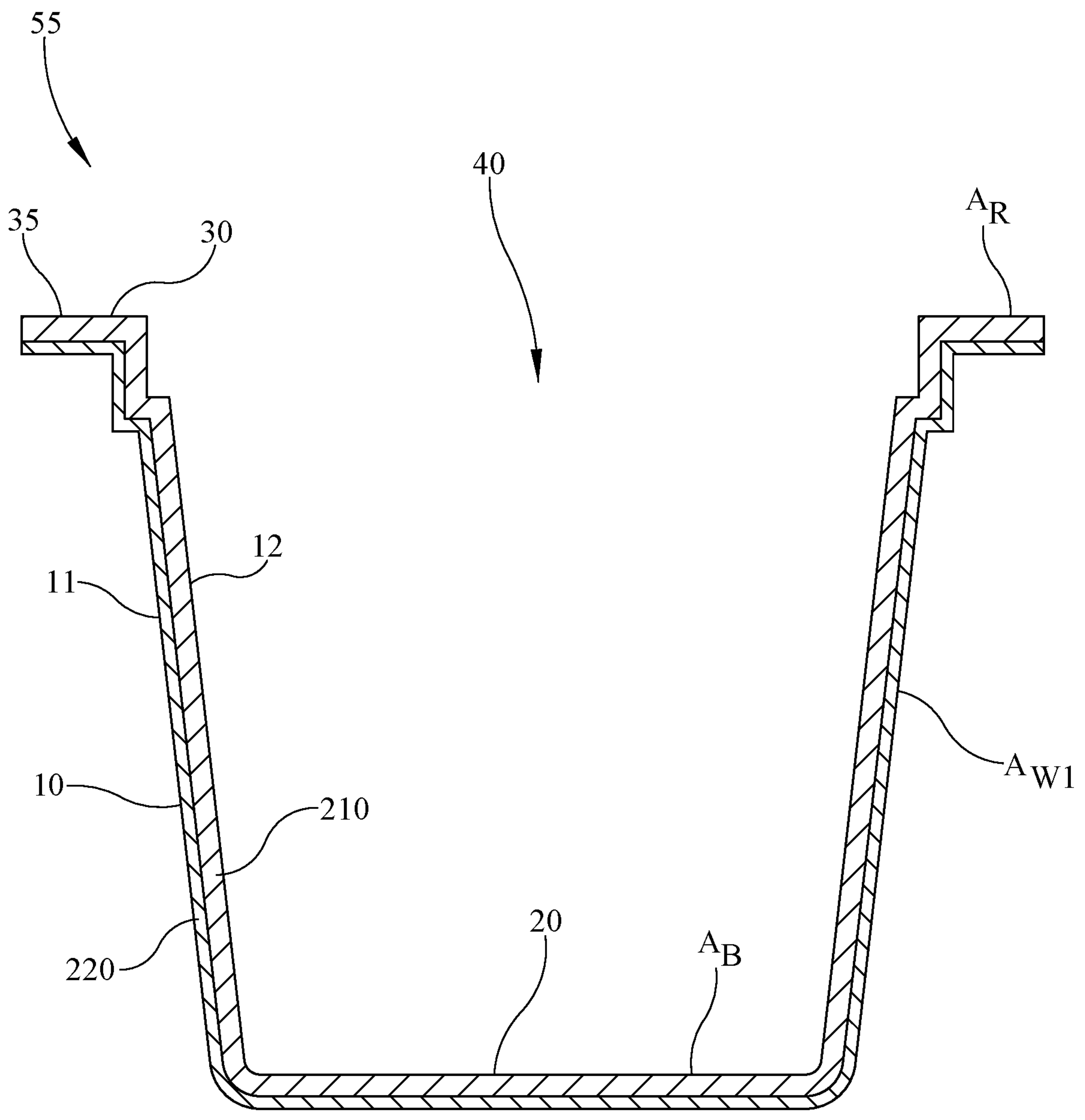
FIG. 17 illustrates a side cross-section view of an embodiment of a container with a laminate layer on the outside.

FIG. 17 is an illustration of a cross-section of a portion of an embodiment of a container 55. Container 55 may be formed into a generally cylindrical shape, having bottom 20, side wall 10, and rim 30, from disk 60 shown in FIGS. 11 and 12, as discussed above. Container 55 may be formed by elongating and/or stretching disk 60 into container 55, which generally results in a stretching and/or thinning of base layer 210 and sheet 220 throughout side wall 10 to form product storage region 40. Similarly, container 700 may be formed by elongating and/or stretching blank 900, which generally results in a stretching and/or thinning of base layer 210 and sheet 220 throughout side wall 710 to form product storage region 740. Although FIGS. 17 through 20 illustrate container 55, package 50, and components thereof, it is understood that the principles discussed in relation to FIGS. 17 through 20 may be applied to container 700, package 750, and components thereof, or other embodiments of containers or packages. Moreover, it is understood that thicknesses and relative thicknesses of any layer of laminate 200, of laminate 200 in sum, of disk 60, of blank 900, and/or of container 55 or container 700 shown in the various figures may not be to scale and may be exaggerated to illustrate the concepts described herein more clearly.

Figure 18:
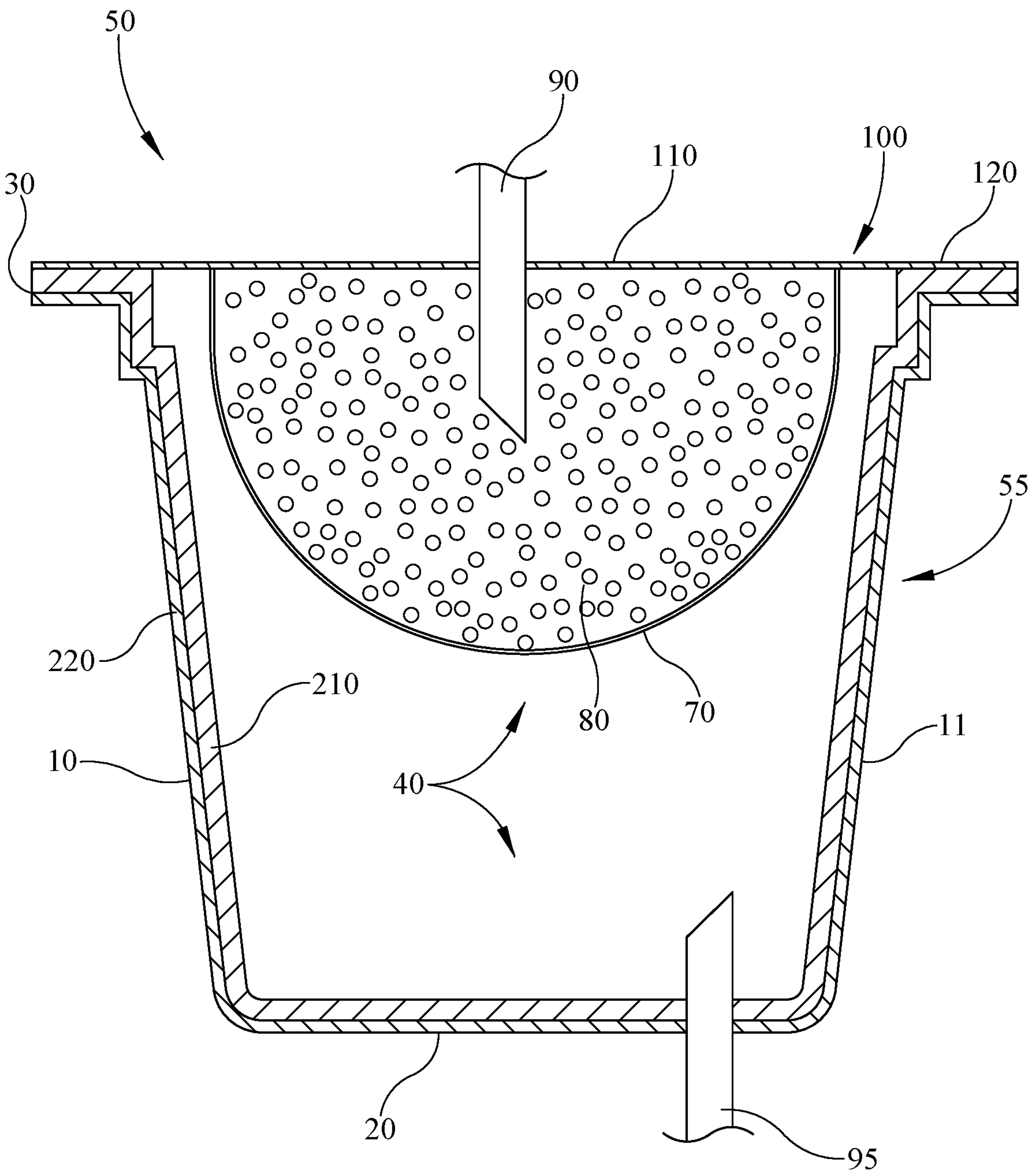
FIG. 18 illustrates a side cross-section view of an embodiment of a pod type package using the container of FIG. 17.

As shown in FIG. 18, container 55 may be formed into package 50, for example, by adding lid 100. Lid 100 may include sealing portion 120 that may be sealed, bonded, coupled, and/or attached to sealing surface 35 of flange or rim 30 of container 55. Lid 100 may include central portion or area 110, substantially surround by sealing portion 120, with central portion 110 covering product storage region 40. Lid 100 and/or lid sealing portion 120 may include a material suitable for bonding or sealing to container 55 such as at rim sealing surface 35. For example, sealing portion 120 may include PP if container 55 includes PP, and/or sealing portion 120 may include PE if container 55 includes PE. It is understood that any of a variety of bonding, coupling, sealing, attaching mechanisms, or any combination thereof may be used when bring lid 100 and container 55 together. A filter 70 having contents 80 may be coupled to lid central portion 110, for example. In this way, for example, a beverage brewing system inlet 90 may pierce or extend through lid 100, allow water to percolate through contents 80 (e.g., coffee grounds or tea leaves) to form a beverage, and the beverage may exit package 50 through an outlet 95.

Figure 19:
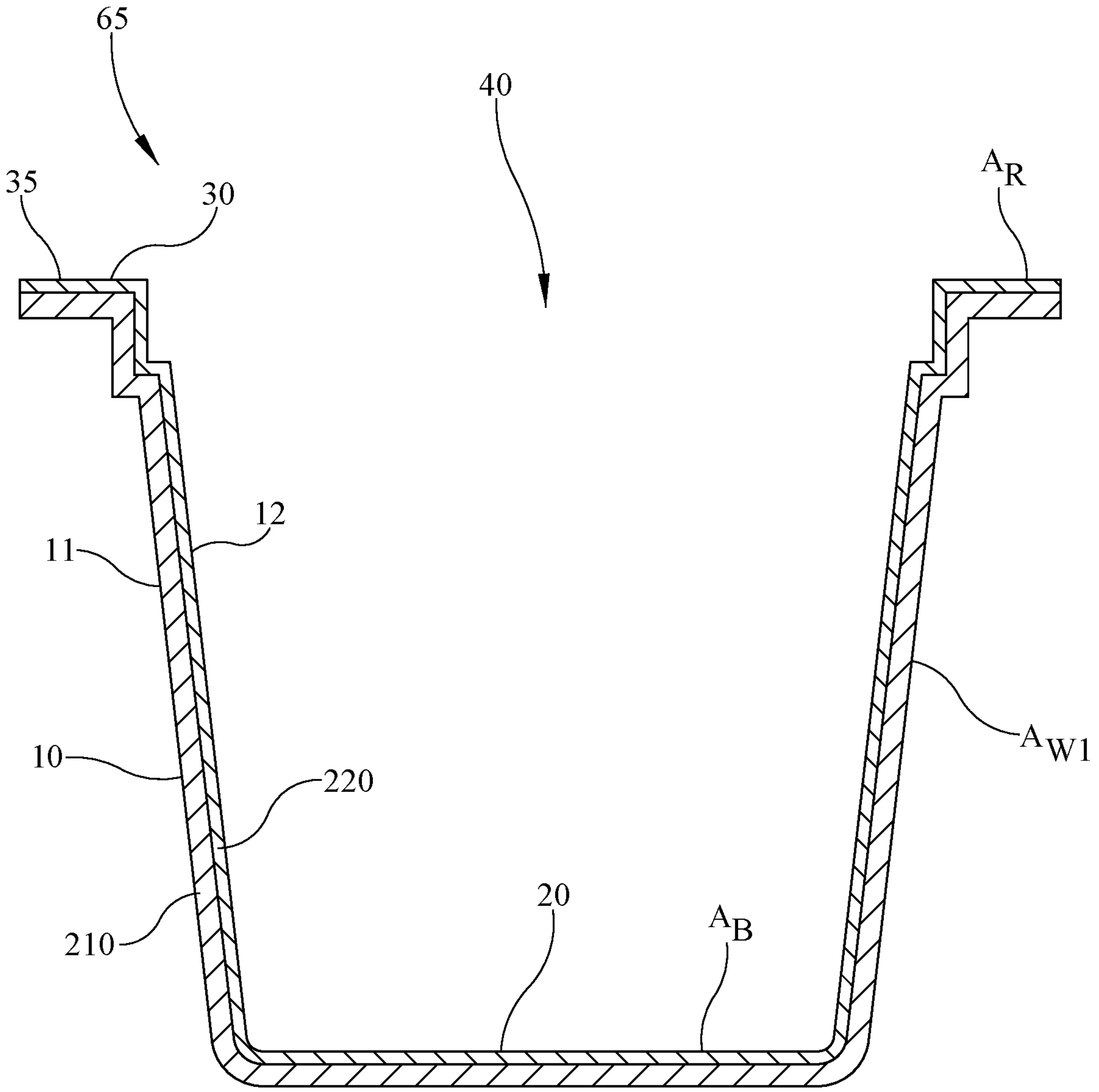
FIG. 19 illustrates a side cross-section view of another embodiment of a container, with a laminate layer on the inside.
Figure 20:
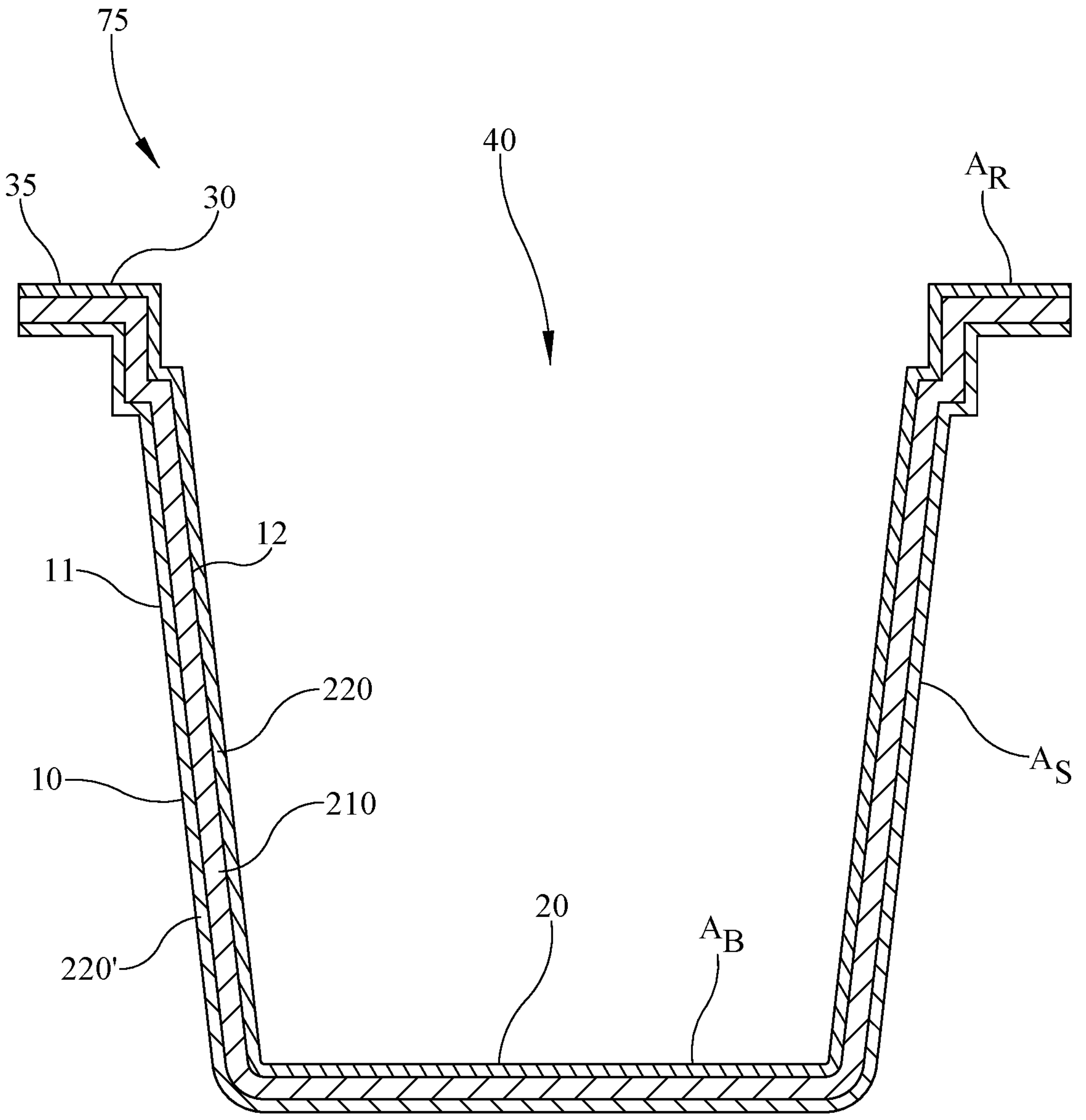
FIG. 20 illustrates a side cross-section view of yet another embodiment of a container with a laminate layer on the inside and another laminate layer on the outside.

FIGS. 19 and 20 illustrate a second embodiment of a container 65 and a third embodiment of a container 75, respectively. The side cross-section view of containers 65 and 75 shown in FIGS. 19 and 20 is similar to the view of container 55 shown in FIG. 17. FIG. 19 is an illustration of a cross-section of a portion of an embodiment of container 65. Container 65 may be formed into a generally cylindrical shape, having bottom 20, side wall 10, and rim 30, from disk 60 shown in FIGS. 11 and 12, or into a generally rectangular shape, having bottom 720, side wall 710, and rim 730, from blank 900 shown in FIGS. 14 and 15, or into virtually any other shape, as discussed above. Container 65 may be formed by elongating and/or stretching disk 60 into container 55, which generally results in a stretching and/or thinning of base layer 210 and sheet 220 throughout side wall 10 to form product storage region 40. As shown in FIG. 19, sheet 220 may be located at or near container inner surface 12 and/or base layer 210 may be located at or near container outer surface 11. In the embodiment shown in FIG. 19, and/or in other embodiments, sheet 220 may at least partially form a top surface of rim 30 and/or sealing surface 35. For example, sheet 220 may be configured and/or formed to provide optimized sealing characteristics in cooperation with lid 100 and/or lid sealing area 120.

FIG. 20 illustrates a third embodiment including container 75 having sheet 220 at or near inner surface 12 of container 75 and a second sheet 220' at or near outer surface 11 of container 75, with base layer 210 positioned between sheet 220 and second sheet 220'. In this embodiment, base layer 210 may be in the middle of the two sheets 220, 220' and/or either or both of sheets 220, 220' may at least partially form outer surface 11, inner surface 12, and/or sealing surface 35. Sheets 220, 220' may be substantially similar to one another, or alternatively, may be formed differently to provide different characteristics and/or for any other reason. For example, sheet 220 at or near inner surface 12 and/or sealing surface 35 may be optimized for contact with comestible product such as coffee and/or coffee grounds as well as sealing with lid 110 or any portion thereof, while second sheet 220' may be optimized for printing and/or aesthetic presentation and/or tactile feel, for example. Continuing this example, either or both of sheets 220, 220' may include barrier properties instead of or in addition to the sealing and/or aesthetic or tactile characteristics discussed. As discussed above, it is understood that, although FIGS. 17 through 20 illustrate container 55, package 50, and components thereof, the principles discussed in relation to FIGS. 17 through 20 may be applied to container 700, package 750, and components thereof. It is further understood that container 55, 65, 75, 750 may be formed with one, two, or more than two sheets.

It is understood that package 50 or package 700, and/or any component thereof, may be made of any of a variety of materials, including, but not limited to, any of a variety of suitable plastics material, any other material, or any combination thereof. Suitable plastics material may include, but is not limited to, polypropylene (PP), polyethylene (PE), polyethylene terephthalate (PET), polystyrene (PS), high-density polyethylene (HDPE), low-density polyethylene (LDPE), linear low-density polyethylene (LLDPE), crystallized polyethylene terephthalate (CPET), polylactic acid (PLA), bioplastics, mixtures and combinations thereof, or any other plastics material or any mixtures and combinations thereof. It is understood that multiple layers of material may be used for any of a variety of reasons, including to improve barrier properties, or to provide known functions related to multiple layer structures. The multiple layers, if included, may be of various materials, including but not limited to those recited herein.

It is further understood that package 50 or package 700, and/or any component thereof, may be substantially rigid, substantially flexible, a hybrid of rigid and flexible, or any combination of rigid, flexible, and/or hybrid, such as having some areas be flexible and some rigid. It is understood that these examples are merely illustrative, are not limiting, and are provided to illustrate the versatility of options available in various embodiments of package 50 or package 700, and/or any component thereof.

It is further understood that any of a variety of processes or combination thereof may be used to form package 50 or package 700, and/or any component thereof, or any layer or substrate used therein. For example, any component, layer, or substrate, or combination thereof, may be thermoformed, injection molded, injection stretch blow molded, blow molded, extrusion blow molded, coextruded, blown, cast, subjected to any other suitable process, or subjected to any combination thereof. In some embodiments, package 50 or package 700, and/or any component thereof may be formed substantially of injection molded and/or thermoformed suitable plastics material, although other materials and forming processes may be used instead of or in addition to injection molding and thermoforming, respectively. Various materials and/or processes may be used to form package 50 or package 700, and/or any component thereof, as will be understood by one of ordinary skill in the art. In some embodiments, package 50 or package 700, and/or any component thereof, may be substantially a one-piece design and/or substantially formed as an integral or unitary structure.

It is understood that, while some directional terms are used herein, such as top, bottom, upper, lower, inward, outward, upward, downward, etc., these terms are not intended to be limiting but rather to relate to one or more exemplary orientations, positions, and/or configurations of package 50 or package 700, and/or any component thereof. It is understood package 50 and/or any component or portion thereof may be inverted or re-oriented to face or point a different direction without departing from the nature of package 50 or package 700 disclosed herein.

These and other modifications and variations may be practiced by those of ordinary skill in the art without departing from the spirit and scope, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the scope of that which is described in the claims. Therefore, the spirit and scope of the appended claims should not be limited to the exemplary description of the versions contained herein.

That which is claimed:

1. A container, comprising:

a side wall having a side wall area;

a bottom having a bottom area;

wherein the side wall and bottom are formed from a laminate having a base layer and a sheet; wherein the base layer has a base layer thickness and the sheet has a sheet thickness;

wherein the laminate has a laminate thickness that is at least the sum of the base layer thickness and the sheet thickness;

wherein the sheet has a thickness that is equal to or less than 5% of the laminate thickness; and wherein the side wall and bottom at least partially define a container area, wherein the container is formed from the laminate having a laminate area used to form the container, and wherein the formed container has an areal draw ratio of greater than about 2.5;

wherein the base layer thickness is at least about 50% of the laminate thickness;

wherein the base layer is on at least one of an inside surface and an outside surface of the laminate; and wherein the base layer thickness is less than or equal to 100 mil, and the thickness of the sheet is within a range of about 2.5 mil to about 5 mil, and wherein the sheet includes a first layer including polypropylene and bonded directly to the base layer, a second layer including polypropylene and bonded to the first layer, a third layer including ethylene vinyl alcohol and bonded to the second layer, a fourth layer including polypropylene and bonded to the third layer, and a fifth layer including polypropylene and bonded to the fourth layer.

2. The container of claim 1, wherein the bottom area is substantially circular in the form of a disk.

3. The container of claim 1, wherein the bottom area is substantially rectangular in the form of a blank.

4. The container of claim 1, further including a flange having a rim area and a rim sealing surface, the rim sealing surface suitable for bonding a lid to the flange, wherein the areal draw ratio is calculated including the rim area, and wherein the flange is adjacent to and surrounds an opening into the container.

5. The container of claim 4, wherein the rim sealing surface is radially outward of and completely surrounds the opening into the container, and wherein the flange has a flange diameter that is greater than an opening diameter of the opening surrounded by the flange.

6. The container of claim 1, wherein the areal draw ratio is greater than about 2.8.

7. The container of claim 6, wherein the areal draw ratio is greater than about 3.1.

8. The container claim 7, wherein the areal draw ratio is greater than about 3.4.

9. The container of claim 1, wherein the second layer, the third layer, and the fourth layer in the sheet each have an average thickness that is equal to or less than 0.6 mil.

10. The container of claim 1, wherein the base layer thickness is at least about 80% of the laminate thickness.

11. The container of claim 1, wherein the base layer is formed substantially of polypropylene, and wherein the first layer has a thickness that is about 32% of the thickness of the sheet, the second layer has a thickness that is about 12% of the thickness of the sheet, the third layer has a thickness that is about 12% of the thickness of the sheet, the fourth layer has a thickness that is about 12% of the thickness of the sheet, and the fifth layer has a thickness that is about 32% of the thickness of the sheet.

12. The container of claim 1, wherein the thickness of the third layer is less than or equal to about 1.25% of an overall thickness of the container.

* * * * *